(12) United States Patent
Sakurahara et al.

(10) Patent No.: US 8,905,180 B2
(45) Date of Patent: Dec. 9, 2014

(54) WORKING VEHICLE

(75) Inventors: Kiyofumi Sakurahara, Ehime (JP); Koji Furukawa, Ehime (JP)

(73) Assignee: Iseki & Co., Ltd., Ehime-ken (JP)

( * ) Notice: Subject to any disclaimer, the term of this patent is extended or adjusted under 35 U.S.C. 154(b) by 383 days.

(21) Appl. No.: 13/417,450

(22) Filed: Mar. 12, 2012

(65) Prior Publication Data
US 2013/0160593 A1 Jun. 27, 2013

(30) Foreign Application Priority Data
Dec. 27, 2011 (JP) ................................ 2011-284663

(51) Int. Cl.
*B60K 5/00* (2006.01)
(52) U.S. Cl.
USPC ................ 180/291; 296/72; 74/492; 280/779
(58) Field of Classification Search
USPC ............... 180/291, 68.5, 68.6, 312, 315, 90; 296/72; 74/492; 280/779
See application file for complete search history.

(56) References Cited

U.S. PATENT DOCUMENTS

| | | | | |
|---|---|---|---|---|
| 4,685,529 | A * | 8/1987 | Tamura et al. ............. | 180/89.12 |
| 5,479,693 | A * | 1/1996 | Oyama ........................... | 29/469 |
| 6,499,550 | B2 * | 12/2002 | Matsuda et al. ............... | 180/90 |
| 6,591,927 | B1 * | 7/2003 | Honekamp et al. ........... | 180/90 |
| 6,758,301 | B2 * | 7/2004 | Shiba et al. ................... | 180/383 |
| 7,558,658 | B2 | 7/2009 | Kuramoto et al. | |
| 7,931,301 | B2 * | 4/2011 | Matsumoto ................... | 280/834 |
| 8,205,701 | B2 * | 6/2012 | Kuramoto et al. ........... | 180/68.5 |
| 8,474,562 | B2 * | 7/2013 | Elhardt et al. ............. | 180/89.12 |
| 2013/0186227 | A1 * | 7/2013 | Sakurahara ..................... | 74/491 |

FOREIGN PATENT DOCUMENTS

| | | |
|---|---|---|
| JP | 53-084516 | 7/1978 |
| JP | 10-108501 A | 4/1998 |
| JP | 2003-054274 A | 2/2003 |
| JP | 2006-304691 A | 11/2006 |
| JP | 2007-8317 A | 1/2007 |
| JP | 2008-247236 A | 10/2008 |

OTHER PUBLICATIONS

Japanese Office Action for Application No. 2011-284663 dated Apr. 8, 2014.

* cited by examiner

*Primary Examiner* — Drew Brown
(74) *Attorney, Agent, or Firm* — RatnerPrestia

(57) ABSTRACT

A working vehicle attachable an implement includes a steering wheel which is disposed in a rear side of an engine hood covering an engine compartment for accommodating an engine, a control panel which is disposed near the steering wheel, a joy-stick control lever which is disposed in a rear side of the engine hood and in a lateral side of the steering wheel, a valve which is disposed in the rear side of the engine hood and is connected to the joy-stick control lever, a top cover which is disposed below the control panel, a bottom cover which includes a portion standing up from a floor surface and is a front portion of a floor part, and a middle cover which is disposed between the top cover and the bottom cover, wherein the valve is covered by the top cover and the middle cover, and the middle cover is detachable.

10 Claims, 19 Drawing Sheets

WORKING VEHICLE

BACKGROUND OF THE INVENTION

1. Field of the Invention

The present invention relates to a working vehicle such as a tractor, which is provided with an engine at the front portion thereof, and the working vehicle of which an implement is attachable to the front or rear portion thereof.

2. Related art of the Invention

A tractor described in each patent document of Japanese Patent Application Laid-Open Nos. 2007-8317 and 2006-304691 is known as a conventional example of a working vehicle of which a front loader, as an example of the implement, is attached to a front portion.

This conventional tractor is a four-wheel drive tractor which is driven by front wheels and rear wheels, and a driving force generating portion covering an engine with an engine hood is disposed on the front portion of the tractor. A operator's seat is disposed between the left and right rear wheels, and a roll-over protective structure with a top horizontal bar and a pair of vertical support columns is provided vertically behind the operator's seat.

As shown in FIG. 19, in the case of such conventional tractor, a radiator 8, the engine (not illustrated) and the various machine components that are associated with the engine are accommodated in the engine compartment R that is formed by the engine hood 4.

A frame structure 10, which is made from aluminum die-casting, serving as the rear wall of the driving force generating portion is provided vertically at the rear portion of the engine compartment R, and a panel cover 11 and a center cover 12 which covers a whole of the structure below the panel cover 11 are attached to the frame structure 10.

An instrument panel and various switches (not illustrated) are installed in the panel cover 11, and a rear side ventilation opening 14 whose structure blocks out dust is formed in the center cover 12. The outside air which has been introduced through the rear side ventilation opening 14 is sucked in by a radiator fan (not illustrated) and guided to the radiator 8, and then the air flows forward in the engine compartment R, and as a result, the heat within the engine compartment R is discharged to the outside through ventilation openings (not illustrated) in the front face and lateral fore portions of the engine hood 4.

As shown in FIG. 19, a valve unit 39, which is connected to a lift cylinder and a bucket cylinder (not illustrated) that move a front loader and a bucket (not illustrated), is disposed in the space which is formed at the lower portion of the frame structure 10. An operation lever 47 for operating the valve unit 39 is disposed at the upper right side of the frame structure 10, and further, a battery 31 is located at the intermediate position in the vertical direction of the frame structure 10.

The valve unit 39 is furnished with two spools 48 and 49 (see FIG. 19) that can slide to a right and left direction and that project to the right side of the vehicle body, where the one spool 48 can be slid among three positions to select an extension state, a retraction state, or an intermediate stationary state of the lift cylinder (not illustrated), and the other spool 49 can be slid among three positions to select an extension state, a retraction, state, or an intermediate stationary state of the bucket cylinder (not illustrated).

The operation lever 47 and the two spools 48 and 49 (see FIG. 19) are operatively connected by a link mechanism 50 which includes a lift rod 57 and a tilt rod 61. When the operator moves the operation lever 47 to a lengthwise direction or a right-left side direction of the vehicle body, the lift cylinder or the bucket cylinder is actuated, and thereby, the rising and lowering operation of the front loader or the roll-back and dumping operation of the bucket is performed.

The lift rod 57, the tilt rod 61, and the valve unit 39 are covered and hidden by the center cover 12, and the outside air that is sucked in through the rear side ventilation openings 14 of the center cover 12 and circulated toward the radiator 8 cools the valve unit 39 and the battery 31.

SUMMARY OF THE INVENTION

Technical Problem

However, according to the conventional working vehicle, of course, in the case of the maintenance of the valve unit 39 as one example of the structure parts placed below a steering wheel 36, even in the case of simple check of it, it is necessary to remove the center cover 12 which is a big part covering the whole of the structure below the panel cover 11.

In view of the above-mentioned problem of the conventional working vehicle, the present invention is directed to a working vehicle having a constitution in which the simple check with respect to the structure parts such as a valve can be performed by detaching of the cover of smaller size.

Means for Solving the Problems

To achieve the above described purpose of the present invention, the $1^{st}$ aspect of the present invention is a working vehicle attachable an implement, comprising:

a steering wheel which is disposed in a rear side of an engine hood covering an engine compartment for accommodating an engine;

a control panel which is disposed near the steering wheel;

an operation lever which is disposed in a rear side of the engine hood and in a lateral side of the steering wheel;

a valve which is disposed in the rear side of the engine hood and is connected to the operation lever;

an upper side cover which is disposed in an upper part of space between the control panel and a floor part; and a lower side cover which is formed so as to stand up from a front portion of the floor part, to be constituted in a single unit with the floor part, and which is disposed in a lower part of the space, neighboring to the upper side cover, wherein the valve is covered by the lower side cover, and the upper side cover is detachable.

According to the working vehicle mentioned above, it becomes possible to perform the simple check with respect to a valve as an example when the upper side cover among the upper side cover and the lower side cover, that cover the space between the control panel and the floor part, is detached.

Further, the $2^{nd}$ aspect of the present invention is a working vehicle attachable an implement, comprising:

a steering wheel which is disposed in a rear side of an engine hood covering an engine compartment for accommodating an engine;

a control panel which is disposed near the steering wheel;

an operation lever which is disposed in a rear side of the engine hood and in a lateral side of the steering wheel;

a valve which is disposed in the rear side of the engine hood and is connected to the operation lever;

a top cover which is disposed below the control panel;

a bottom cover which includes a portion standing up from a floor surface and is a front portion of a floor part, and a middle cover which is disposed between the top cover and the bottom cover, wherein the valve is covered by the top cover and the middle cover, and the middle cover is detachable.

According to the working vehicle mentioned above, it becomes possible to perform the simple check with respect to a valve as an example when at least the middle cover among the top cover, the bottom cover and the middle cover, that cover the lower part of the control panel, is detached.

The $3^{rd}$ aspect of the present invention is the working vehicle according to the $2^{nd}$ aspect of the present invention, comprising:

a link mechanism which connects the operation lever to the valve, wherein the link mechanism is covered by the top cover.

Accordingly, the above mentioned working vehicle provides an effect that the product value of the working vehicle improves remarkably, because the link mechanism is covered with the top cover, so that the structure of the link mechanism does not appear on the appearance.

The $4^{th}$ aspect of the present invention is the working vehicle according to the $2^{nd}$ aspect of the present invention, comprising:

a steering column frame which supports the steering wheel; and a battery, wherein the battery is disposed in a upper portion of a front side of the steering column frame.

Accordingly, the above mentioned working vehicle provides an effect that it is unnecessary to provide a supporting structure for only a battery.

The $5^{th}$ aspect of the present invention is the working vehicle according to the $4^{th}$ aspect of the present invention, comprising:

a radiator, wherein the radiator is disposed in a front side of the battery, and is supported by the steering column frame.

Accordingly, the above mentioned working vehicle provides an effect that it is unnecessary to provide a supporting structure for only a radiator.

The $6^{th}$ aspect of the present invention is the working vehicle according to the $5^{th}$ aspect of the present invention, wherein each cover of the top cover and the middle cover has a ventilation opening for sucking outside air which cools the radiator.

Accordingly, the above mentioned working vehicle provides an effect that it becomes possible to suck in a lot of outside air most efficiently for cooling the radiator through the ventilation opening.

The $7^{th}$ aspect of the present invention is the working vehicle according to the $1^{st}$ aspect of the present invention, comprising:

a link mechanism which connects the operation lever to the valve, wherein the link mechanism is covered by the upper side cover.

Accordingly, the above mentioned working vehicle provides an effect that the product value of the working vehicle improves remarkably, because the link mechanism is covered with the upper side cover, so that the structure of the link mechanism does not appear on the appearance.

The $8^{th}$ aspect of the present invention is the working vehicle according to the $1^{st}$ aspect of the present invention, comprising:

a steering column frame which supports the steering wheel; and a battery, wherein the battery is disposed in a upper portion of a front side of the steering column frame.

Accordingly, the above mentioned working vehicle provides an effect that it is unnecessary to provide a supporting structure for only a battery.

The $9^{th}$ aspect of the present invention is the working vehicle according to the $8^{th}$ aspect of the present invention, comprising:

a radiator, wherein the radiator is disposed in a front side of the battery, and is supported by the steering column frame.

Accordingly, the above mentioned working vehicle provides an effect that it is unnecessary to provide a supporting structure for only a radiator.

The $10^{th}$ aspect of the present invention is the working vehicle according to the $9^{th}$ aspect of the present invention, wherein the upper side cover has a ventilation opening for sucking outside air which cools the radiator.

Accordingly, the above mentioned working vehicle provides an effect that it becomes possible to suck in a lot of outside air most efficiently for cooling the radiator through the ventilation opening.

Advantageous Effects of Invention

According to the present invention, it is possible to provide a working vehicle having a constitution in which the simple check with respect to the structure parts such as a valve can be performed when the cover of smaller size is detached.

PREFERRED EMBODIMENTS OF THE INVENTION

Hereinafter, an embodiment of a tractor in accordance with the present invention will be described with reference to the drawings.

Embodiment 1

Figure 1:
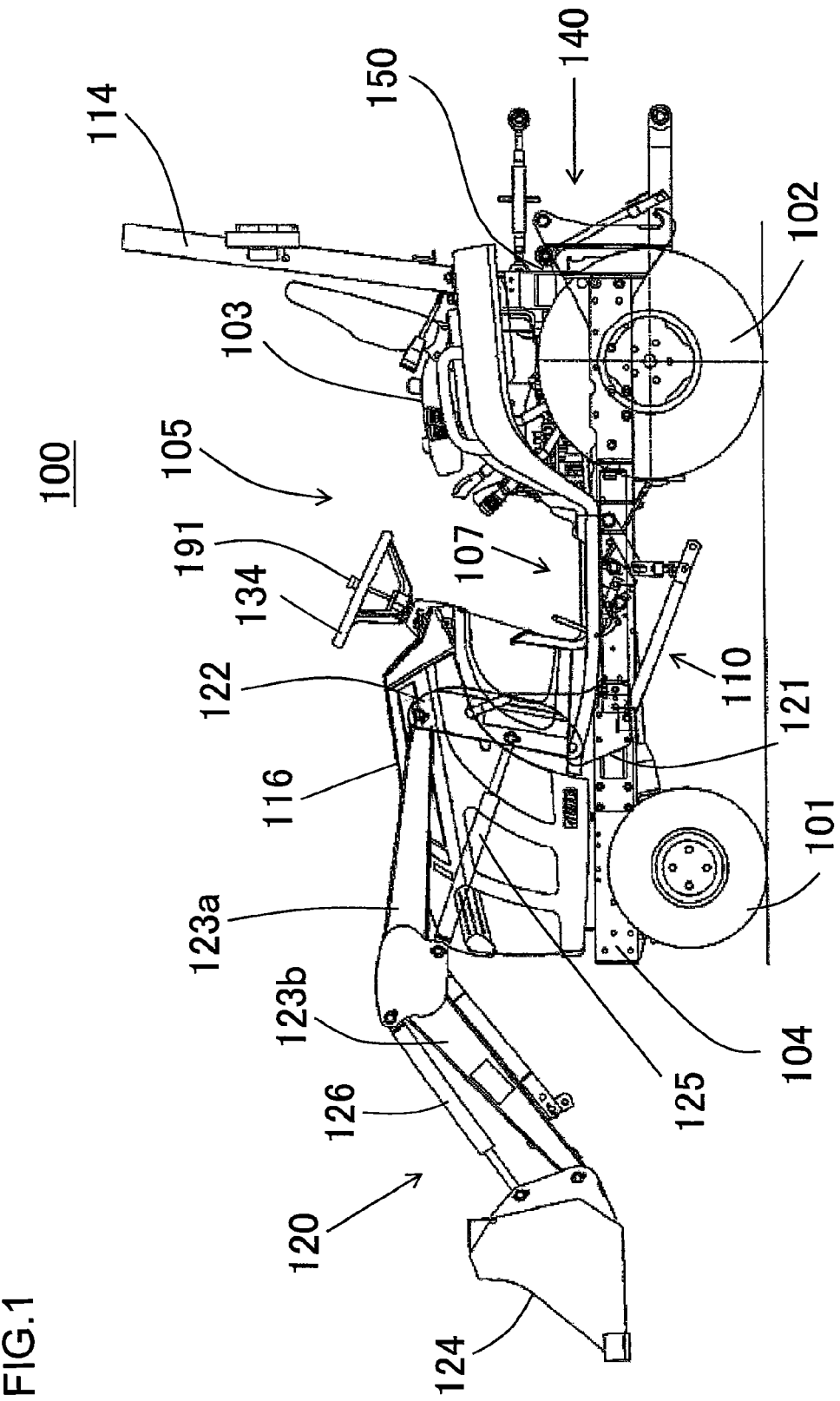
FIG. 1 is a side view illustrating a tractor, to which a front loader is attached, according to Embodiment 1 of the present invention.
Figure 2:
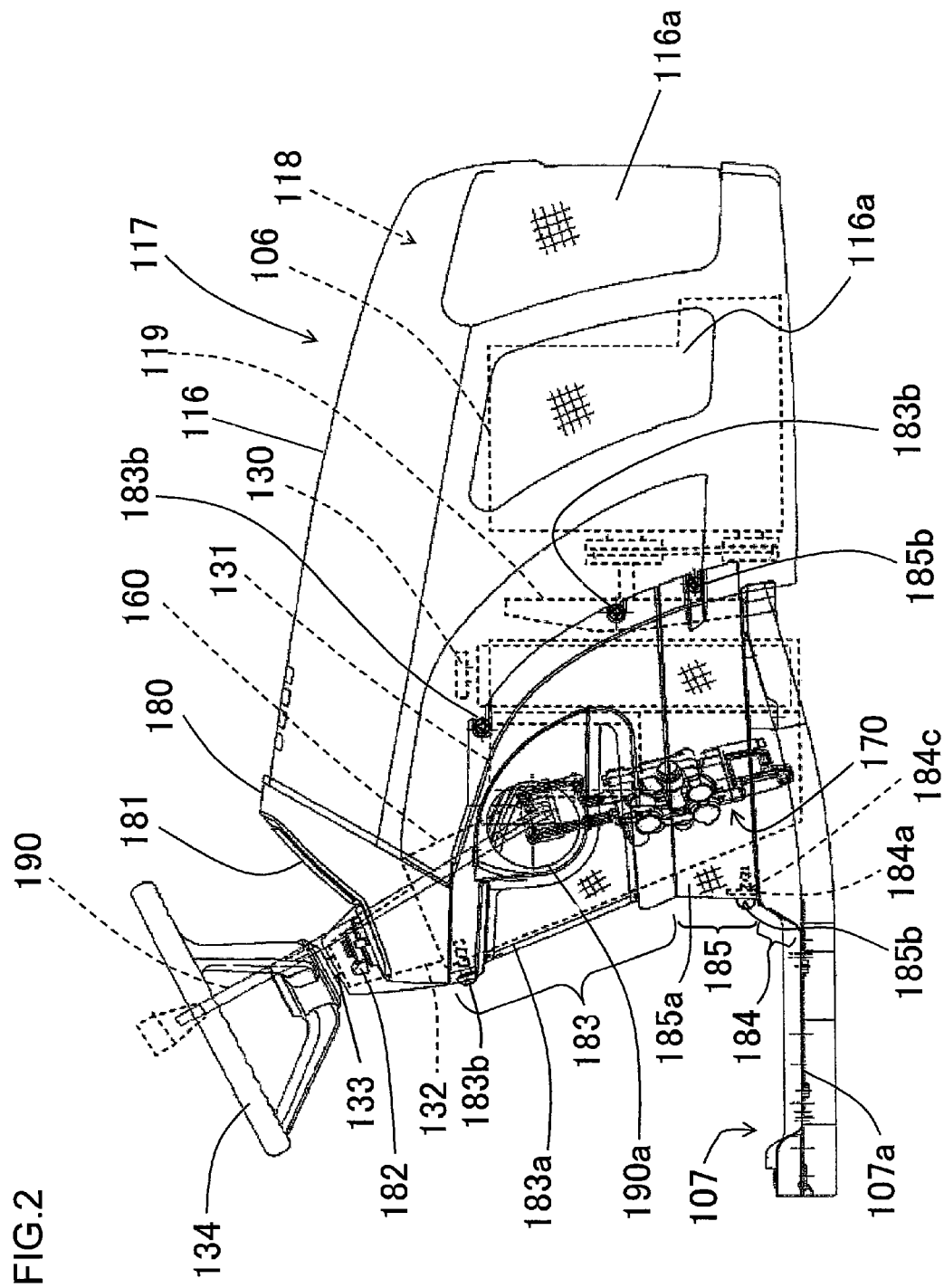
FIG. 2 is a schematic right side view illustrating a front part of a tractor body according to Embodiment 1 of the present invention.

FIG. 1 is a side view illustrating a tractor 100, to which a front loader 120 is attached, according to Embodiment 1 of the present invention, and FIG. 2 is a schematic right side view illustrating a front part of the tractor according to Embodiment 1 of the present invention.

The constitution of the tractor 100 in accordance with the present Embodiment 1 will be mainly described with reference to these drawings.

As shown in FIGS. 1 and 2, the tractor 100 of the present embodiment is provided with i) a tractor body 105 which has a pair of right and left steerable front wheels 101 and a pair of right and left rear wheels 102, and is a four-wheel drive vehicle body constituted so as to run by itself, and ii) a front loader 120 which is detachably connected to a front portion of the tractor body 105.

This tractor body 105 is provided with a driving force generating portion 117 (see FIG. 2) covering an engine 106 with an engine hood 116 at front portion thereof. And the tractor body 105 is provided with an operator's seat 103 above between the left and right rear wheels 102, and a roll-over protective structure 114 with a top horizontal bar and a pair of vertical support columns behind the operator's seat 103.

Further, the tractor body 105 can be provided with a mower unit (not illustrated) to be connected to the chassis 104 between the front wheels 101 and the rear wheels 102 via a link mechanism 110. In that case, a grass collecting unit (not illustrated), which can be moved in a vertical direction by a pair of right and left lift arms 150, can be detachably connected to a rear portion of the chassis 104 via a connecting mechanism 140. The grass collecting unit may not be attached to the tractor body 105 case by case.

As the implement, which is attached to the working vehicle via the connecting mechanism 140, a rotary tiller, a rear mower unit, a fertilization machine, a grader blade, a plow, subsoiler and the like can be used.

Then, an example of a working vehicle according to the present invention corresponds to the tractor body 105 of the present embodiment. An example of an implement according to the present invention corresponds to the front loader 120 of the present embodiment.

The front loader 120 is constituted from a pair of right and left support frames 122 which are detachably connected to support brackets 121 that are provided at the right and left sides of the front portion of the tractor body 105, a pair of right and left first booms 123a which are connected to the each upper end portion of the support frames 122 to be vertically pivotable, a pair of right and left second booms 123b, and a bucket 124 which is connected to the each front end portion of the right and left second booms 123b to be vertically rotatable.

Further, a pair of right and left lift cylinders 125 are disposed below the pair of right and left first booms 123a, and a pair of right and left bucket cylinders 126 are disposed above the pair of right and left second booms 123b.

The pair of right and left first booms 123a and the pair of right and left second booms 123b are vertically driven by the pair of right and left lift cylinders 125, and the bucket 124 is rotatively driven by the pair of right and left bucket cylinders 126.

As shown in FIG. 2, a radiator 130, an engine 106 and various apparatuses associated with it are disposed in an engine compartment 118 made of the engine hood 116.

The constitution of a front part of the tractor body 105 in accordance with the present Embodiment 1 will be further described with reference to FIGS. 2 to 7.

Figure 3:
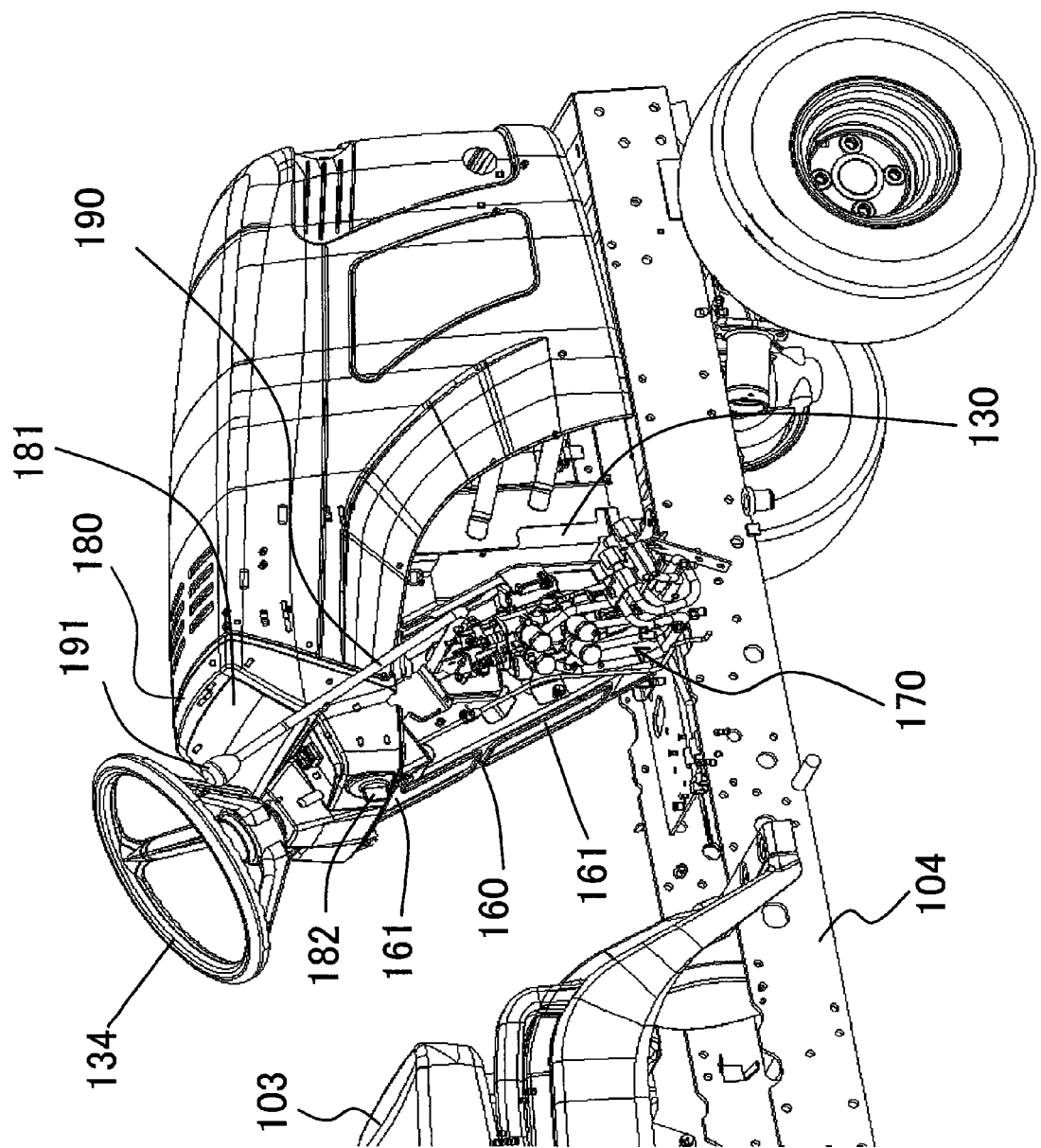
FIG. 3 is a perspective view illustrating an internal structure disposed below a steering wheel at the front part of the tractor body according to Embodiment 1 of the present invention.
Figure 4:
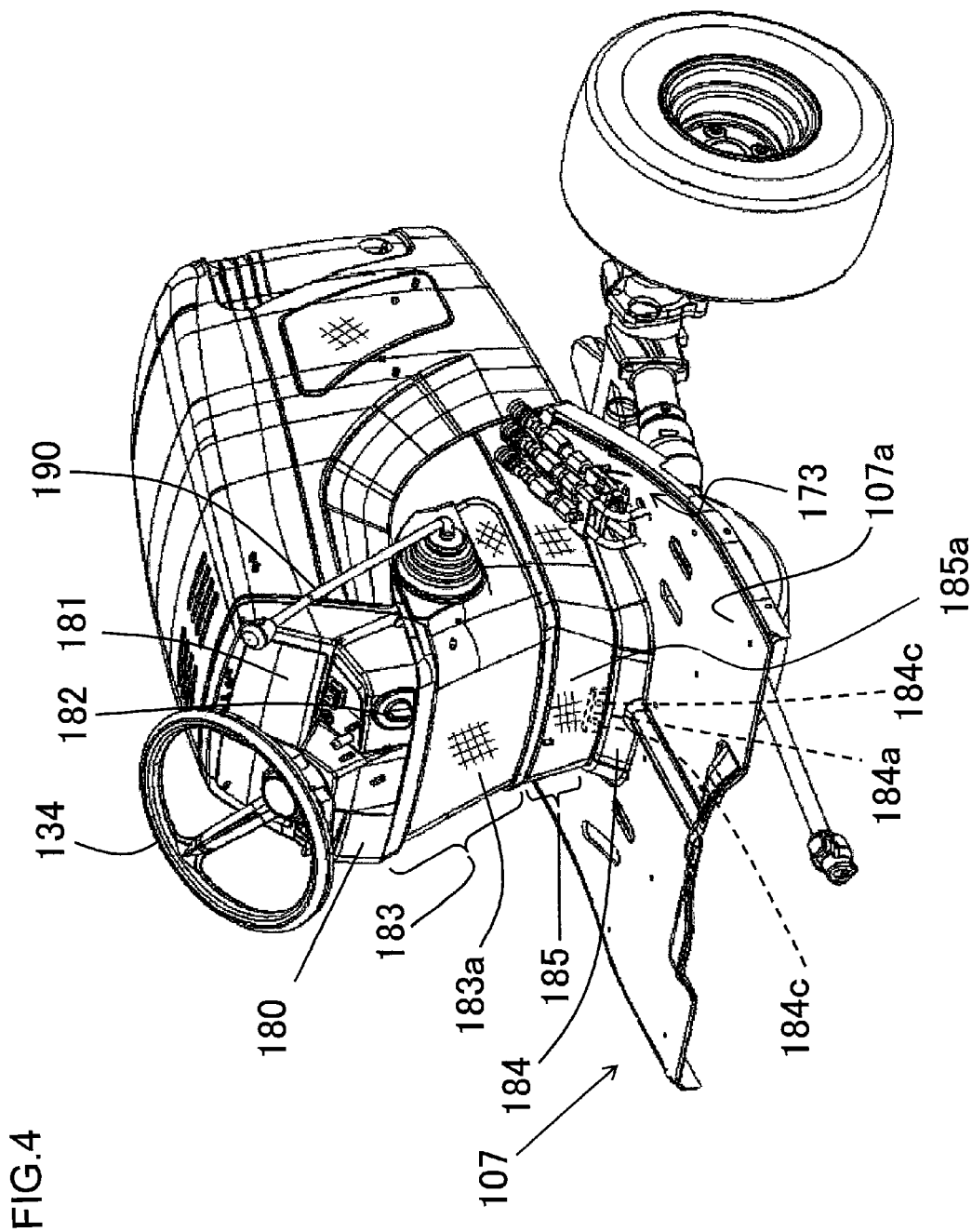
FIG. 4 is a perspective view illustrating the front part of the tractor body according to Embodiment 1 of the present invention.

FIG. 3 is a perspective view illustrating an internal structure disposed bellow a steering wheel at the front part of the tractor body 105 according to the present Embodiment 1. FIG. 4 is a perspective view illustrating the front part of the tractor body 105 according to the present Embodiment 1.

As shown in FIG. 2, a radiator fan 119 is disposed at rear portion of an engine 106, and a steering column frame 160 is disposed rear portion of the radiator fan 119 to be fixed to the chassis 104. Further, the steering column frame 160 is provided with a radiator 130, a battery 131, a valve unit 170 and the like.

Figure 19:
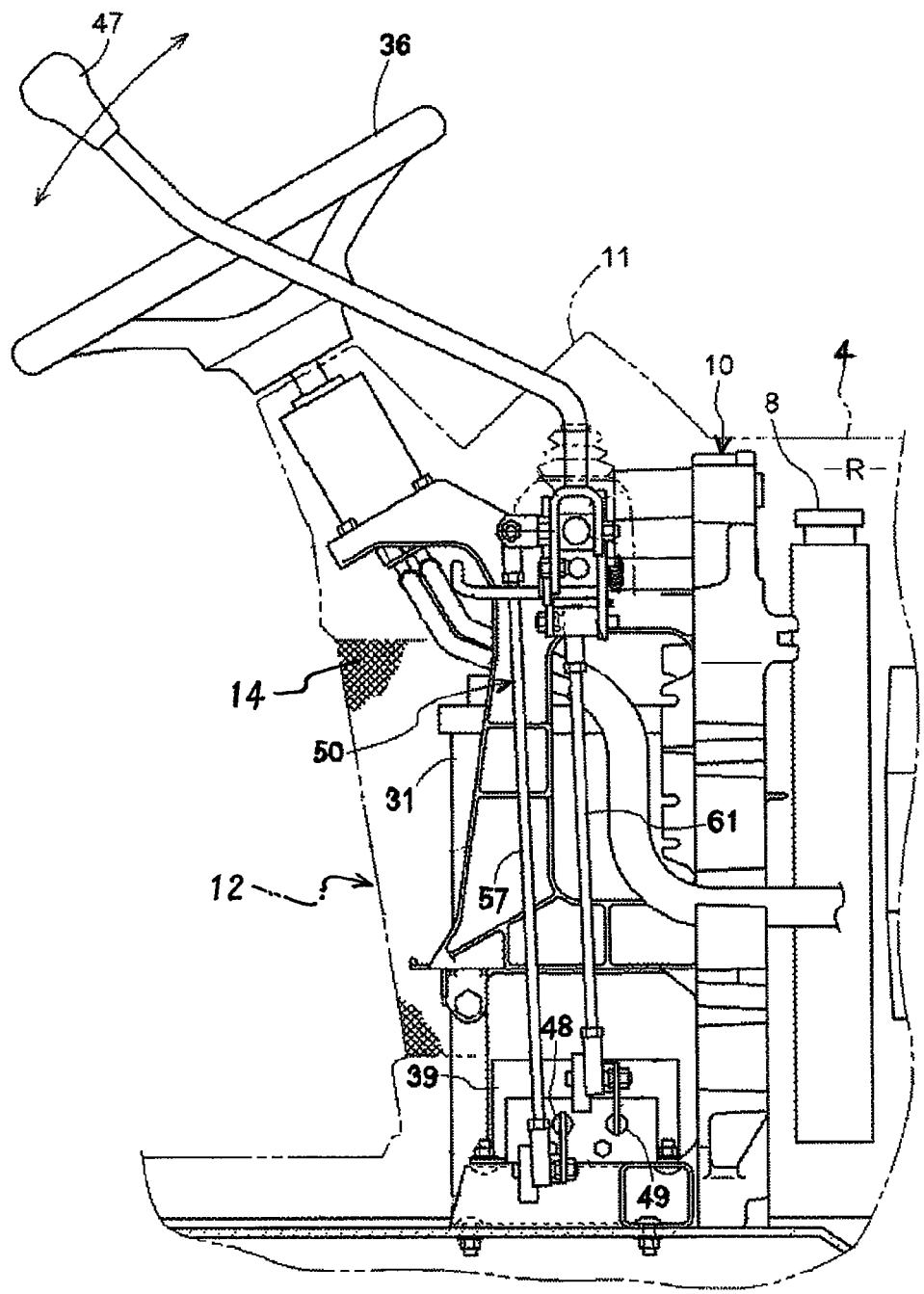
FIG. 19 is a side view illustrating a steering portion of the conventional tractor.

The steering column frame 160 is made with thin metal plates. Therefore, compared with the frame structure 10 made from aluminum die-casting (see FIG. 19), a weight saving of the steering column frame 160 is possible, and the cost of it can be cut down. Since the valve unit 170, which is a required functional part, is attached to the lower right side surface of the steering column frame 160, the center of gravity of the steering column frame 160 lowers, and the whole steering column frame 160 becomes the stable structure body. Thereby, even if the weight saving of the steering column frame 160 is carried out, it is hard to be affected by vibration and noise, and the structural strength also improves.

Figure 6:
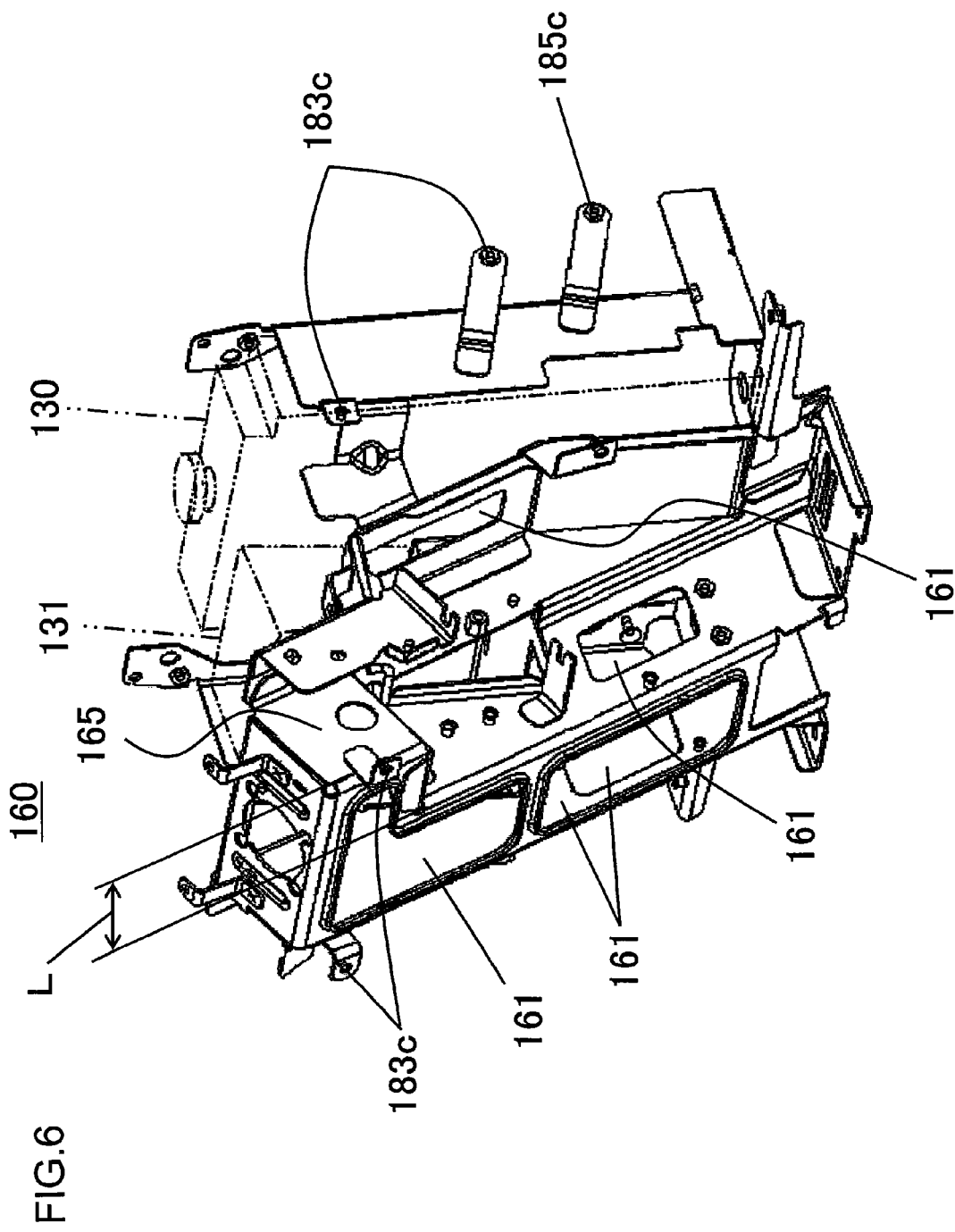
FIG. 6 is a perspective view illustrating a steering column frame according to Embodiment 1 of the present invention.

The steering column frame 160 has a space portion formed by bending only length L of a lower part of the right side surface 165 of the steering column frame 160 to the left-hand side (see FIG. 6). The valve 171 (see FIG. 7) of the valve unit 170 and the link mechanism 172 are disposed in the space portion, thereby, it can be restrained that dimensions of the right and left width of the steering column frame 160 become longer, and a compact constitution can be obtained. Further, since the valve 171 is attached to the surface of the steering column frame 160, it becomes easy to perform an assembling work, a maintenance check work and the like.

Since the steering column frame 160 is provided with all of the radiator 130, the battery 131, the valve unit 170 and the like, and supports them, it is unnecessary to provide a supporting structure for only the radiator, a supporting structure for only the battery and a supporting structure for only the valve unit.

Since the battery 131 is disposed in the upper portion of the front side of the steering column frame 160, it is easy to perform the operation for attaching and detaching the battery 131 to/from the steering column frame 160 and a maintenance check work of the battery 131, which includes a supply or a check of battery liquid, when the engine hood 116 is opened.

Since the radiator 130 is disposed in the front side position of the battery 131, it is easy to perform the maintenance check work of the radiator 130 as well as the battery 131, when the engine hood 116 is opened.

A hydraulic controller 132 for power steering is connected to the upper end portion of the steering column frame 160. An operation shaft 133 which extends upward from the hydraulic controller 132 is provided with a steering wheel 134 (see FIG. 2).

FIG. 6 is a perspective view illustrating the above described steering column frame 160 which is provided with the ventilation openings 161 at the predetermined positions.

As shown in FIG. 2, the upper portion of the steering column frame 160 is covered by a control panel 180 which is provided with an instrument panel 181 and various switches 182, and the lower portion of the steering column frame 160 is covered by a top cover 183, a bottom cover 184 and a middle cover 185 (see FIG. 2). A right side portion of the top cover 183 is provided with a through-hole 190a for a penetrating joy-stick control lever 190 which is used when the operator controls the rising and lowering operation of the front loader 120 and the rollback and dumping operation of the bucket 124. A bottom cover 184 includes a portion standing up from a floor surface 107a of the lower portion of the front side of the operator's seat 103 and is a front portion of a floor part 107. The joy-stick control lever 190 will be further described blow with reference to FIG. 7.

As described above, since the joy-stick control lever 190 protrudes from the through-hole 190a which is formed at the right side portion of the top cover 183 to the outside, a grip part 191 of the joy-stick control lever 190 can be disposed at the best position through the shortest course, where it is easiest to be used by the operator.

As shown in FIG. 2, the radiator 130 and the like which are mounted on the steering column frame 160 are covered by the top cover 183, the bottom cover 184 and the middle cover 185.

As shown in FIG. 2, the valve 171 and a link mechanism 172 (see FIG. 7) are covered by the top cover 183, the bottom cover 184 and the middle cover 185. The battery 131 is covered by the top cover 183.

Figure 15:
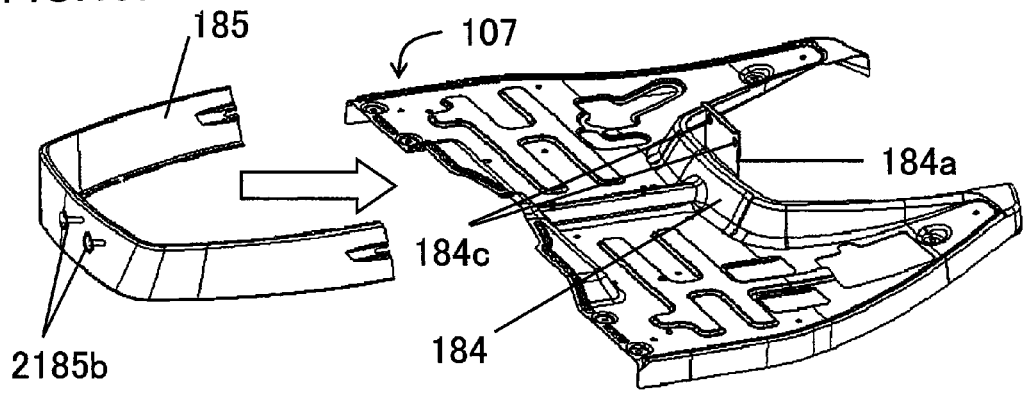
FIG. 15A is a schematic perspective view illustrating a state in which a middle cover is not yet attached to a floor part, according to another Embodiment of the present invention.
FIG. 15B is a schematic perspective view illustrating a state in which a middle cover has been attached to the floor part, according to another Embodiment of the present invention.
FIG. 15C is a schematic perspective view illustrating the front part of the tractor body with the middle cover, according to another Embodiment of the present invention.
Figure 15:
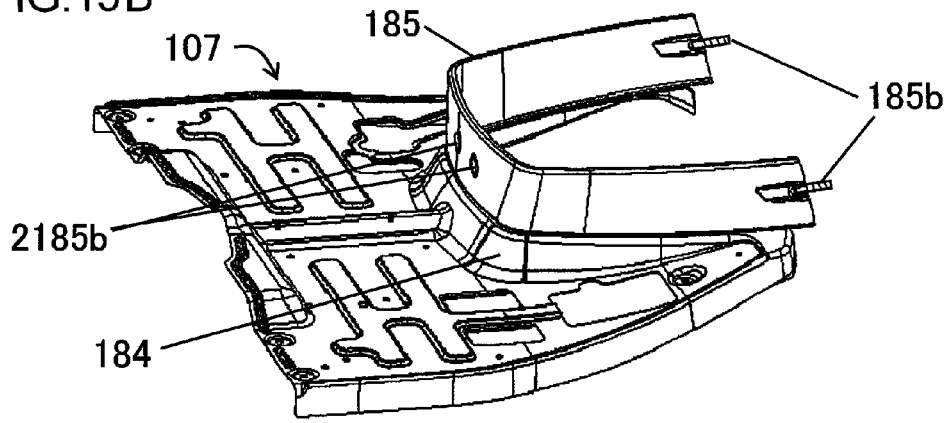
Figure 15:
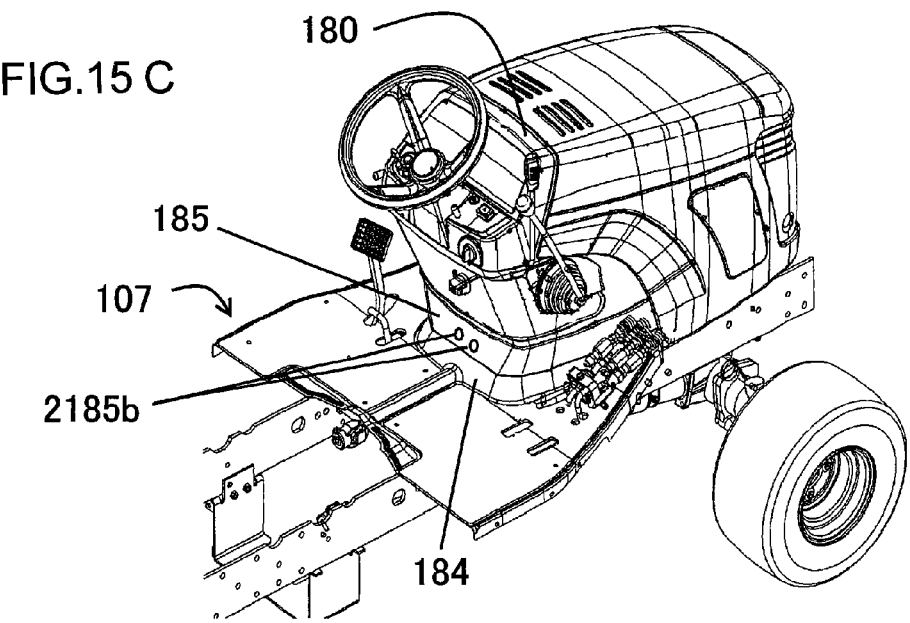

The bottom cover 184 or the steering column frame 160 is provided with a fixing plate 184a(see FIGS. 2 and 4) having a pair of right and left second receiving holes 184c for fixing the middle cover 185 by screws. The fixing method of this portion can be constituted so that the middle cover 185 can be detached and attached by only a plug-type stop member other than a screw without using a tool. This matter will be further described blow with reference to FIG. 15.

The middle cover 185 is fixed to the steering column frame 160 and so on by screws so that it can be detached independently. To be more specific, the middle cover 185 is fixed to the pair of right and left second receiving holes 184c formed on the fixing plate 184a of the bottom cover 184 and a pair of right and left third receiving holes 185c(see FIG. 5) formed on the steering column frame 160 by a pair of right and left third screws 185b(see FIG. 2). Therefore, when the operator performs a simple check with respect to the valve 171, it is easy to detach the middle cover 185 due to its smaller size.

Incidentally, as described above, regarding the fixing method of the middle cover 185 by using the pair of right and left second receiving holes 184c, it can be constituted so that the middle cover 185 can be detached and attached by only the plug-type stop member as shown in FIGS. 15A to 15C. Thereby, it becomes further easy to perform the operation for attaching and detaching the middle cover 185.

FIG. 15A is a schematic perspective view illustrating a state in which the middle cover 185 is not yet attached to the floor part 107, FIG. 15B is a schematic perspective view illustrating a state in which the middle cover 185 has been attached to the floor part 107, and FIG. 15C is a schematic perspective view illustrating the front part of the tractor body with the middle cover 185, according to another Embodiment of the present invention.

As shown in FIG. 15A, a pair of right and left plug-type stop pins 2185b as an example of the plug-type stop member are fixed to the center portion of the middle cover 185. As shown in FIG. 15B, when the middle cover 185 is attached to the tractor body 105, each tip part of the pair of right and left plug-type stop pins 2185b is inserted in the pair of right and left second receiving holes 184c formed on the fixing plate 184a, and then the both end portions of the middle cover 185 are fixed to the pair of right and left third receiving holes 185c(see FIG. 5) formed on the steering column frame 160 by the third screws 185b.

Further, each edge portion of the inner circumference of the second receiving holes 184c can be covered with a rubber member. According to the above constitution, since each surface of the plug-type stop pins 2185b sticks to the surface of the rubber member, each position of the plug-type stop pins 2185b is stabilized and the vibration of the middle cover 185 can be reduced.

The top cover 183 is fixed to the steering column frame 160 by screws so that it can be detached independently. To be more specific, the top cover 183 is fixed to a pair of right and left first receiving holes 183c formed on a rear part frame 160a(see FIGS. 5 and 9) of the steering column frame 160, and to a pair of right and left first receiving holes 183c formed on a front part frame 160b(see FIGS. 5 and 9) by the first screws 183b, respectively.

Therefore, these first screws 183b are removed and then the slide movement of the top cover 183 is carried out along the direction of a standup of the joy-stick control lever 190, so that the top cover 183 can be detached.

As some examples of the detaching the top cover 183, besides the simple check of the valve 171, the cases of an exchange of the valve unit 170, a maintenance of the instrument panel 181 and the like are mentioned.

According to the above constitution, the efficiency of the simple check, the maintenance and the like improves.

Accordingly, since at least the top cover 183 and the middle cover 185 can be independently detached, respectively, when the simple check or the maintenance of the structure parts disposed below the control panel 180 is performed, the working efficiency improves by detaching of the cover with smaller size corresponding to the working.

By the way, the top cover 183 and the control panel 180 can be constituted in a single unit.

The product value of the working vehicle improves remarkably, because the link mechanism 172 (see FIG. 7) to be described later is covered with the top cover 183, so that the structure of the link mechanism does not appear on the appearance.

Further, as shown in FIG. 4, a coupler unit 173 to be described later is disposed near the right side of the middle cover 185. Therefore, if the top cover 183 and the middle cover 185 are formed in a single unit, it is difficult to detach the cover which is formed as the single unit structure and is penetrated by the joy-stick control lever 190, unless the coupler unit 173 is removed. However, according to the present embodiment, since the top cover 183 and the middle cover 185 are not formed as a single unit structure, that is they are independent constitution each other, it is possible to remove the top cover 183 penetrated by the joy-stick control lever 190 even if the coupler unit 173 is not removed.

Incidentally, as described above, the bottom cover 184 is a part of the floor part 107. Therefore, it is necessary to remove the whole of the floor part 107 fixed to the chassis 104 by screws in order to remove the bottom cover 184. Therefore, the floor part 107 including the bottom cover 184 may be removed to do the required work.

As shown in FIG. 2, a first ventilation opening 183a and a third ventilation opening 185a having a structure for blocking dust are formed in the top cover 183 and the middle cover 185, respectively. The outside air which has been introduced through the first ventilation opening 183a and the third ventilation opening 185a, is sucked in by a radiator fan 119 through the ventilation openings 161 etc. and is guided to the radiator 130, and then the air flows forward in the engine compartment 118, and as a result, the heat within the engine compartment 118 is discharged to the outside through ventilation openings 116a in the front face and lateral fore portions of the engine hood 116.

Accordingly, it becomes possible to suck in a lot of outside air most efficiently for cooling the radiator through the ventilation opening. Further, since the ventilation openings 161 are formed near the valve 171 and the link mechanism 172, the cooling efficiency of the valve unit 170 improves.

Figure 5:
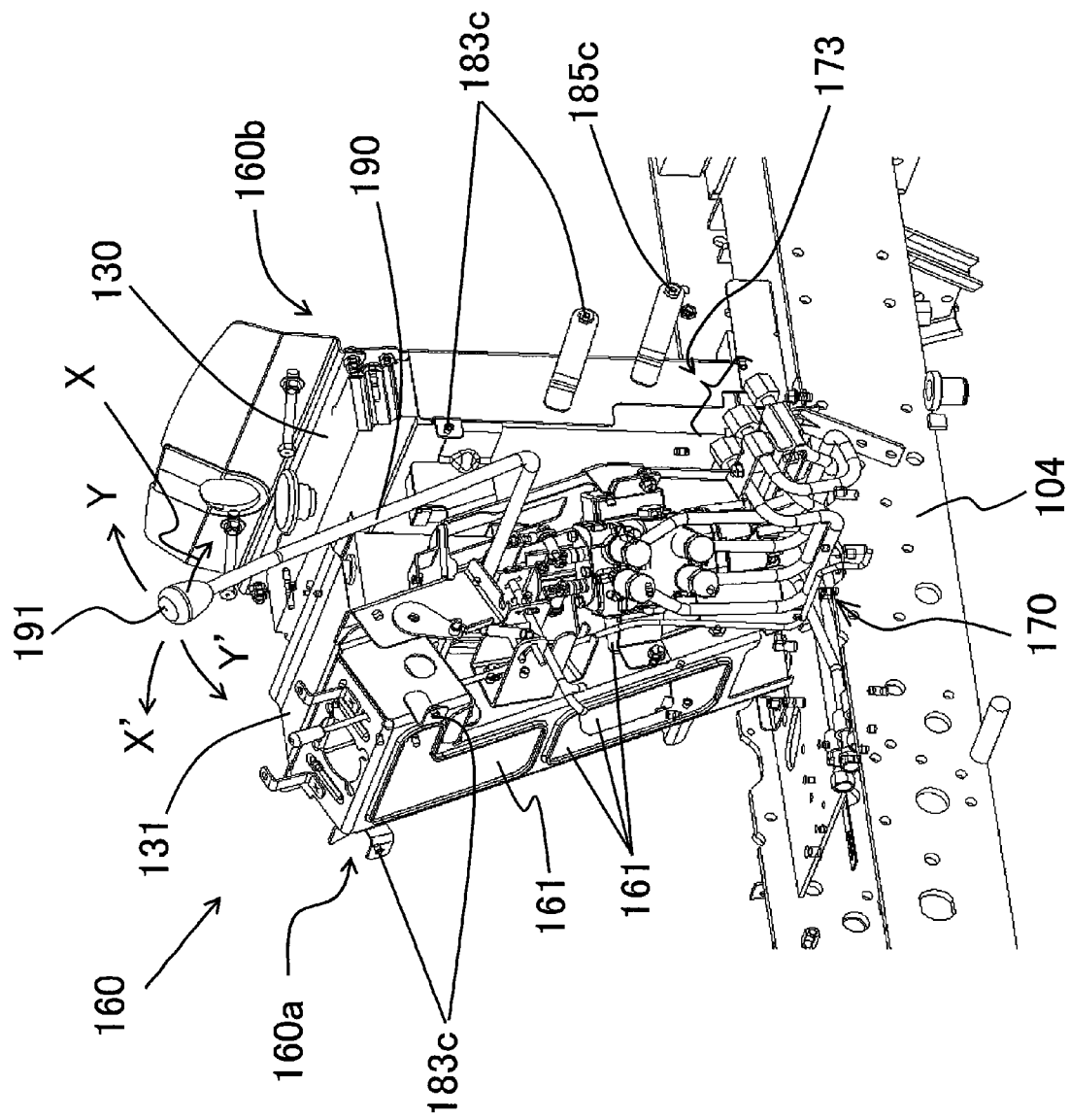
FIG. 5 is a perspective view illustrating an internal structure of the tractor body and a steering column frame provided with a radiator, battery, valve unit and the like, according to Embodiment 1 of the present invention.

As shown in FIG. 5, the valve unit 170 disposed at the lower portion of the right side of the steering column frame 160 is constituted so that the piping connection with the lift cylinder 125 and the bucket cylinder 126 via the coupler unit 173 can be carried out. FIG. 5 is a perspective view illustrating an internal structure of the tractor body 105 shown in FIG. 3 of the present embodiment, and a steering column frame 160 provided with a radiator 130, battery 131, valve unit 170 and the like.

FIG. 6 is a perspective view illustrating a steering column frame 160 of the tractor body 105 of the present embodiment.

As described above, since the radiator 130, the battery 131, the valve unit 170 and the like are held by the steering column frame 160, the tractor body 105 of the present embodiment can have more functions by fewer constitution parts.

Figure 9:
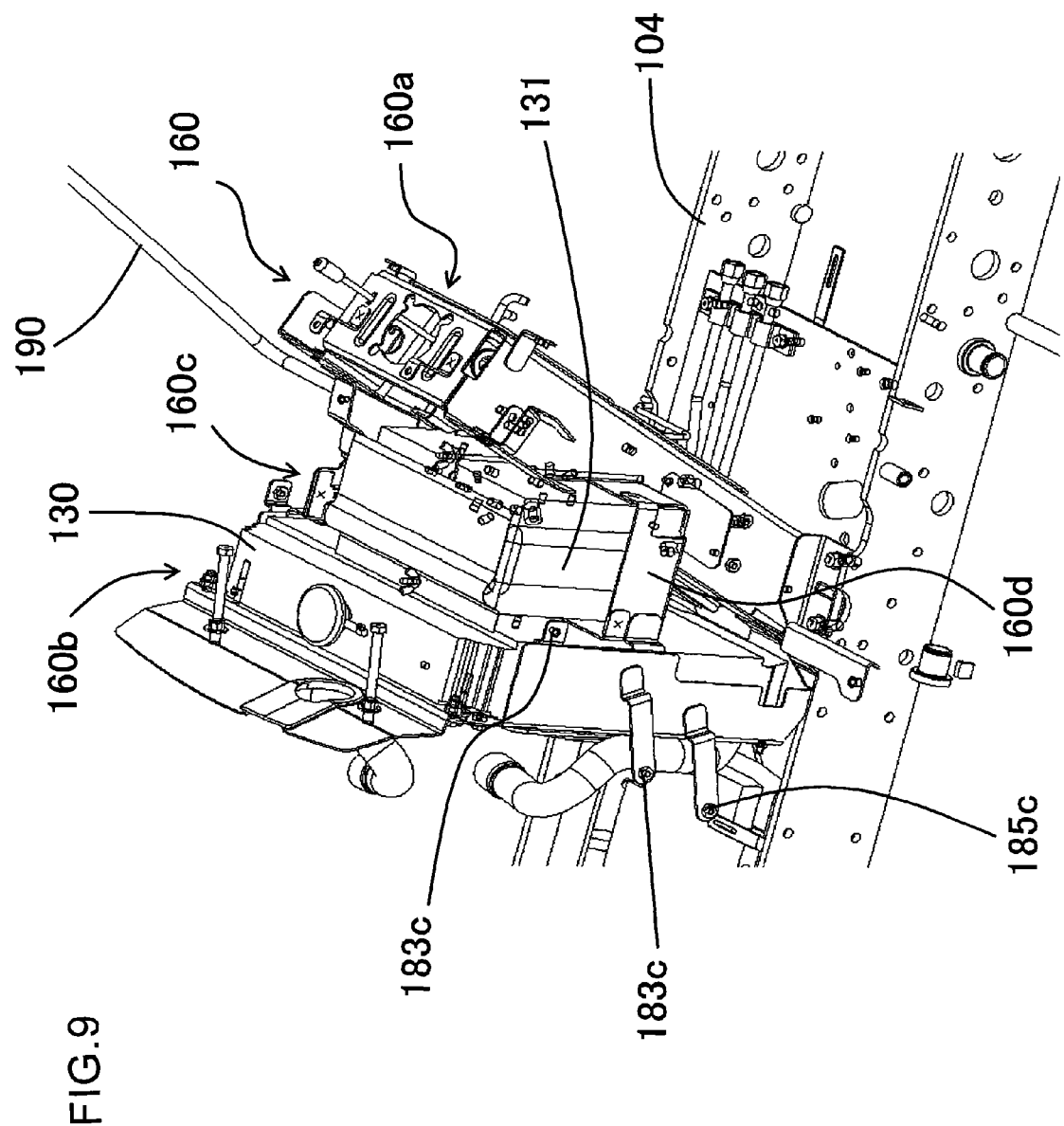
FIG. 9 is a perspective view illustrating the internal structure of the tractor body which is shown in FIG. 5 and is seen from still another direction, according to Embodiment 1 of the present invention.

As shown in FIG. 9, the steering column frame 160 comprises a rear part frame 160a supporting the steering wheel 134 mainly, a front part frame 160b supporting the radiator 130, and a middle part frame 160c supporting the battery 131. The middle part frame 160c has a constitution for connecting the rear part frame 160a and the front part frame 160b each other, and is provided with a battery holder 160d.

By the way, an example of an operation lever according to the present invention corresponds to the joy-stick control lever 190 of the present embodiment.

Figure 7:
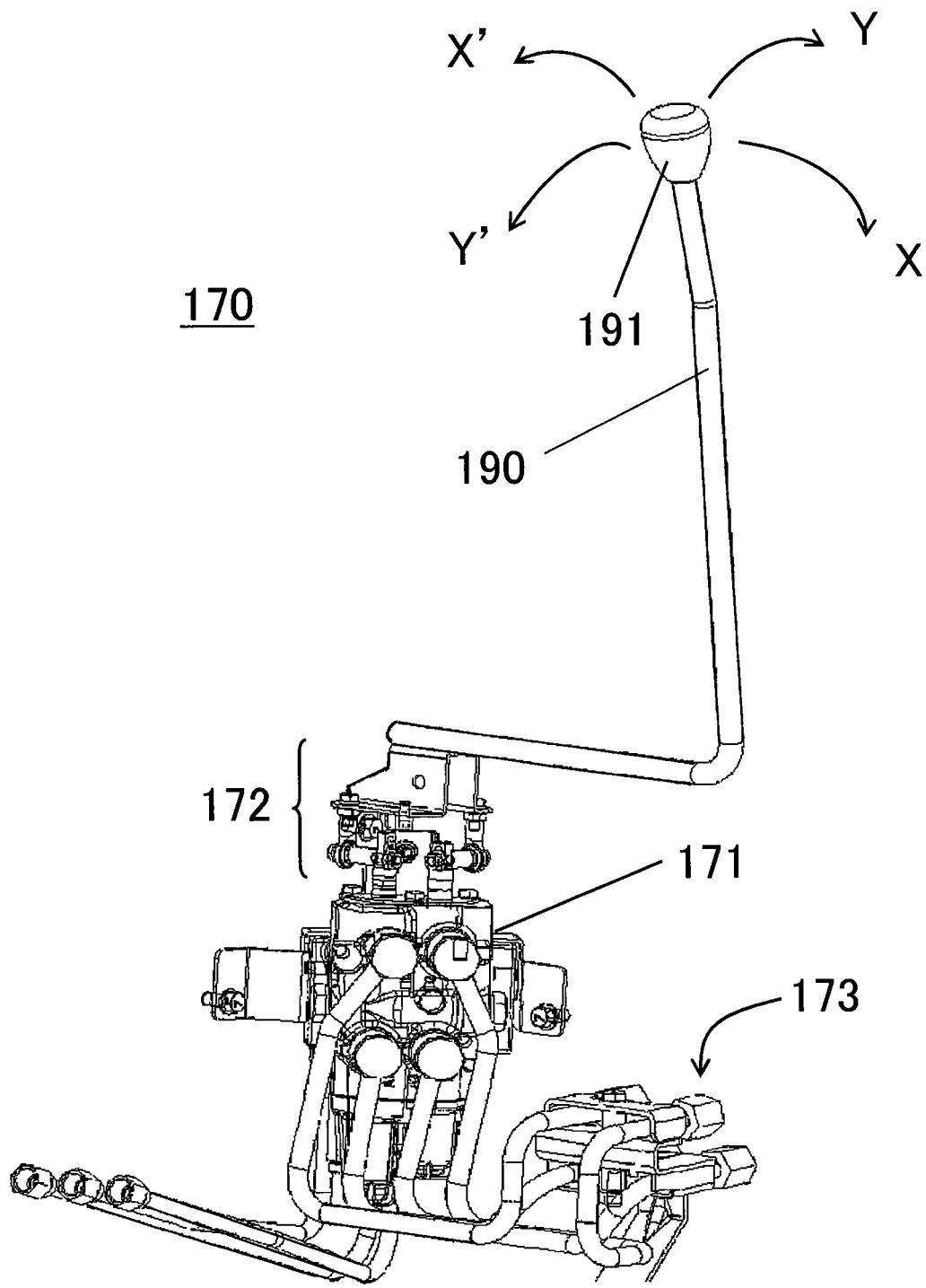
FIG. 7 is a perspective view illustrating a valve unit according to Embodiment 1 of the present invention.

Next, constitution of the valve unit 170 will be described with reference to FIG. 7. FIG. 7 is a perspective view illustrating a valve unit 170 of the tractor body 105 of the present embodiment.

As shown in FIG. 7, the valve unit 170 comprises the valve 171, the joy-stick control lever 190, the link mechanism 172 which transmits the movement of the joy-stick control lever 190 to the valve 171, the coupler unit 173 including the piping parts, and the like.

Incidentally, the lower end portion of the joy-stick control lever 190 is fixed to the upper end portion of the link mechanism 172 by screws.

An example of a valve according to the present invention corresponds to the valve 171 of the present embodiment.

When the operator moves the joy-stick control lever 190 in a lengthwise direction of the tractor body 105 (see arrows Y and Y' shown in FIG. 7), the lift cylinder 125 expands or contracts, so that the rising and lowering operation of the front loader 120 is performed. Further, when the operator moves the joy-stick control lever 190 in a right-left side direction of the tractor body 105 (see arrows X and X' shown in FIG. 7), the bucket cylinder 126 expands or contracts, so that the rollback and dumping operation of the bucket 124 is performed.

According to the above described constitution, the joy-stick control lever 190 can be connected to the valve 171 by using the more simple constitution of the link mechanism 172.

Further, since the valve 171, the joy-stick control lever 190, the link mechanism 172 connecting them, and the coupler unit 173 are constituted as a single unit, it becomes possible to assemble the valve unit 170 beforehand in another manufacturing process, and then the increase in efficiency of the assembly process and the improvement in quality can be achieved.

As shown in FIGS. 3 and 4, the valve 171 and the link mechanism 172 (see FIG. 7) can be seen by detaching the top cover 183, the bottom cover 184 and the middle cover 185. Therefore, when the check, repair, or exchange of at least the valve 171 and the link mechanism 172 are carried out, or the exchange of the whole of the valve unit 170 is carried out, it is easy to detach and attach these parts from and to the tractor body 105.

The various electric wiring (not illustrated) stored in the protection tube (not illustrated) is located by effectively using space in the steering column frame 160 provided with the battery 131, valve unit 170 and the like.

Figure 8:
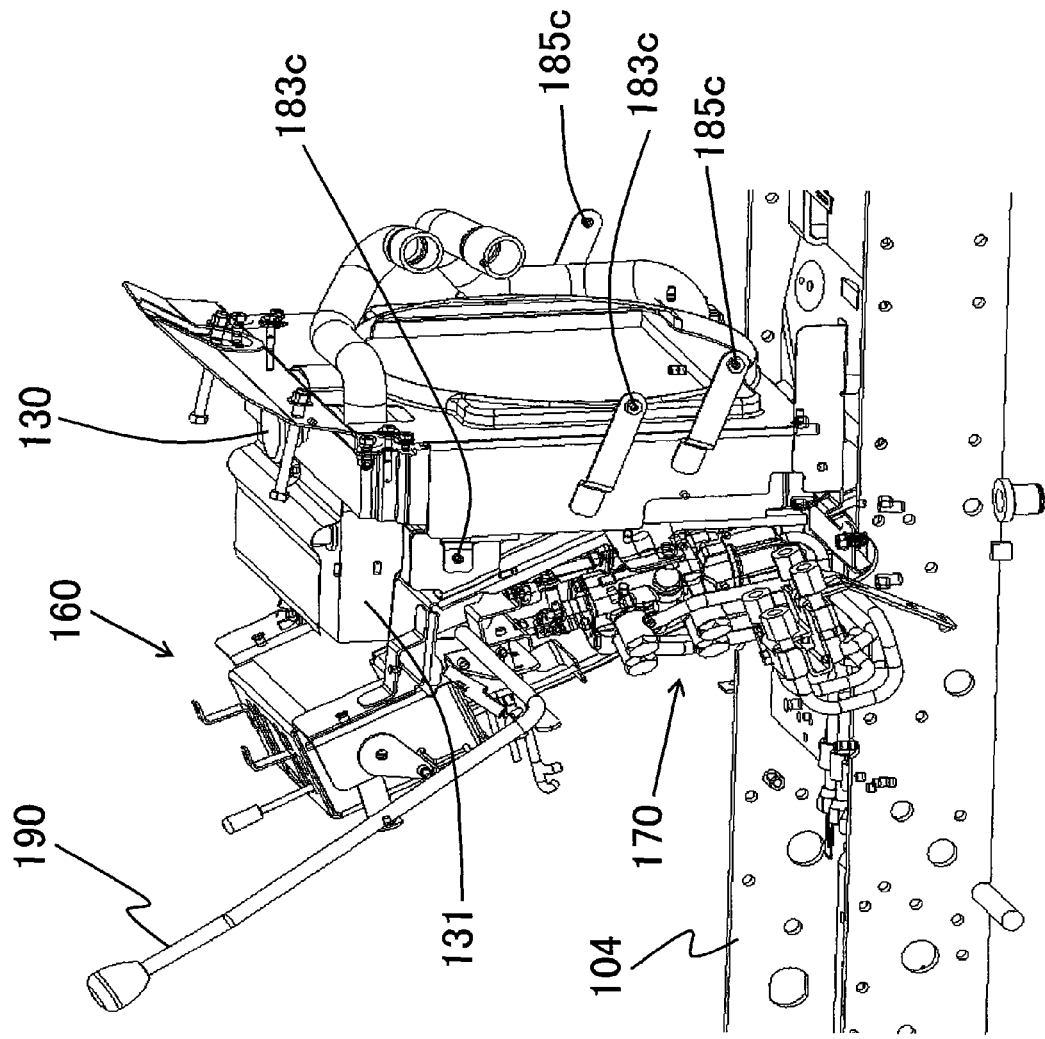
FIG. 8 is a perspective view illustrating the internal structure of the tractor body which is shown in FIG. 5 and is seen from another direction, according to Embodiment 1 of the present invention.
Figure 10:
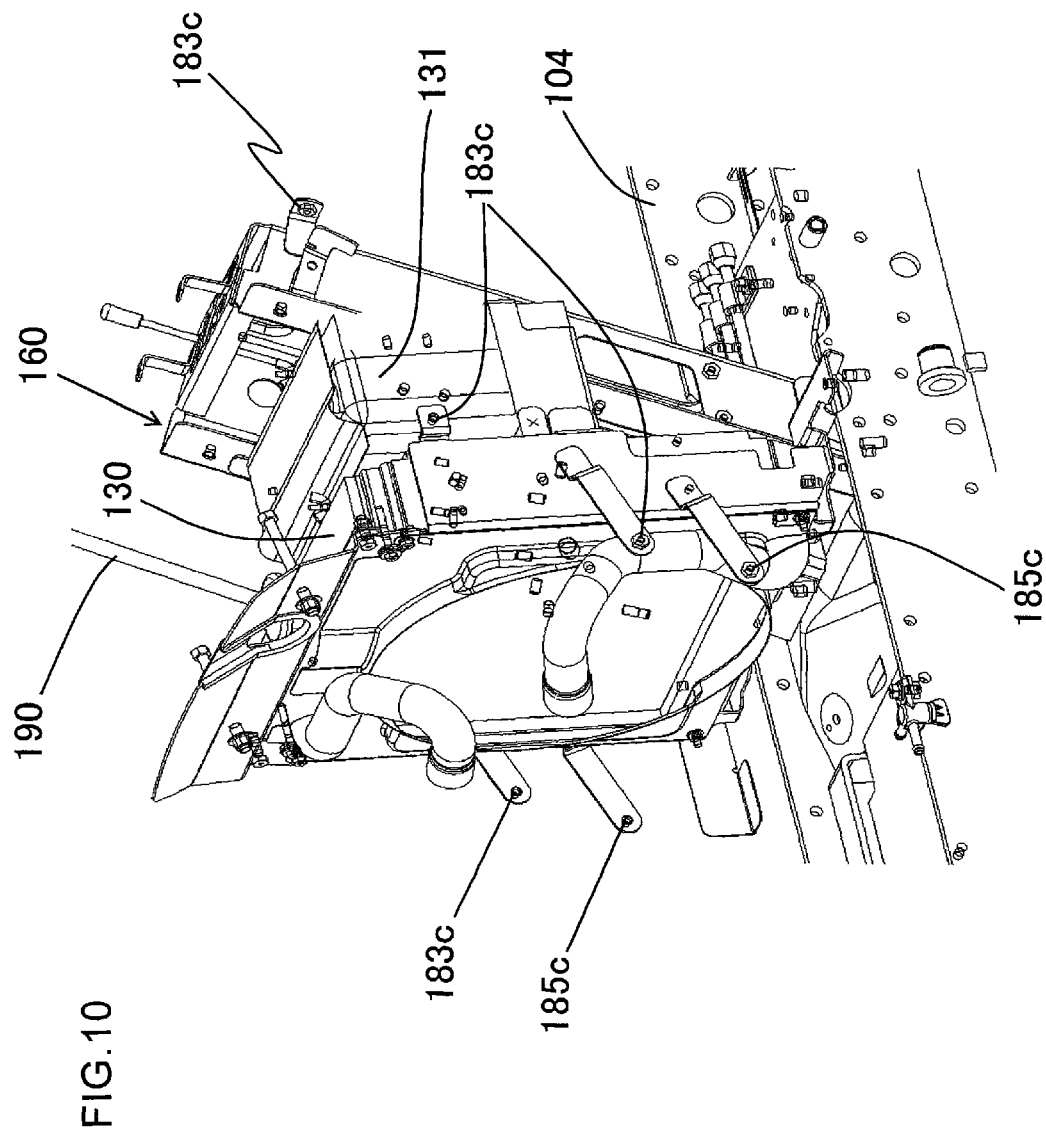
FIG. 10 is a perspective view illustrating the internal structure of the tractor body which is shown in FIG. 5 and is seen from further still another direction, according to Embodiment 1 of the present invention.

By the way, FIGS. 8 to 10 are perspective views illustrating the internal structure of the tractor body 105 which is shown in FIG. 5 and is seen from another direction, according to Embodiment 1 of the present invention. Therefore, in these figures, the same reference signs are used for the constructional parts which are the same as the constructional parts described above.

Embodiment 2

Figure 11:
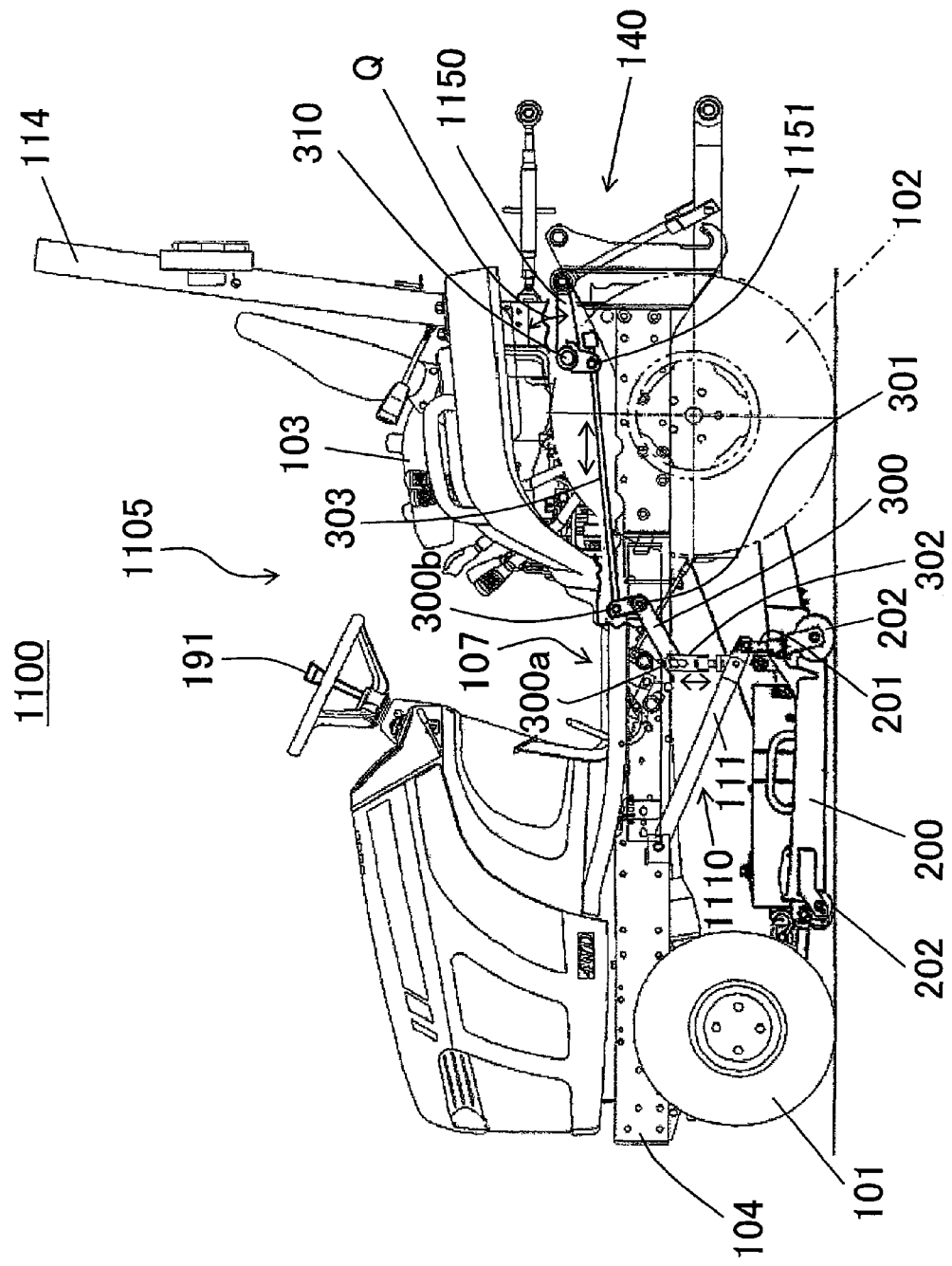
FIG. 11 is a side view illustrating a tractor, to which a mower unit is attached, according to Embodiment 2 of the present invention.

FIG. 11 is a side view illustrating a second tractor 1100 according to Embodiment 2 of the present invention. As shown in FIG. 11, a tractor body 1105 corresponds to the tractor body 105 of the Embodiment 1 to which a mower unit 200 and the like are attached.

Figure 12:
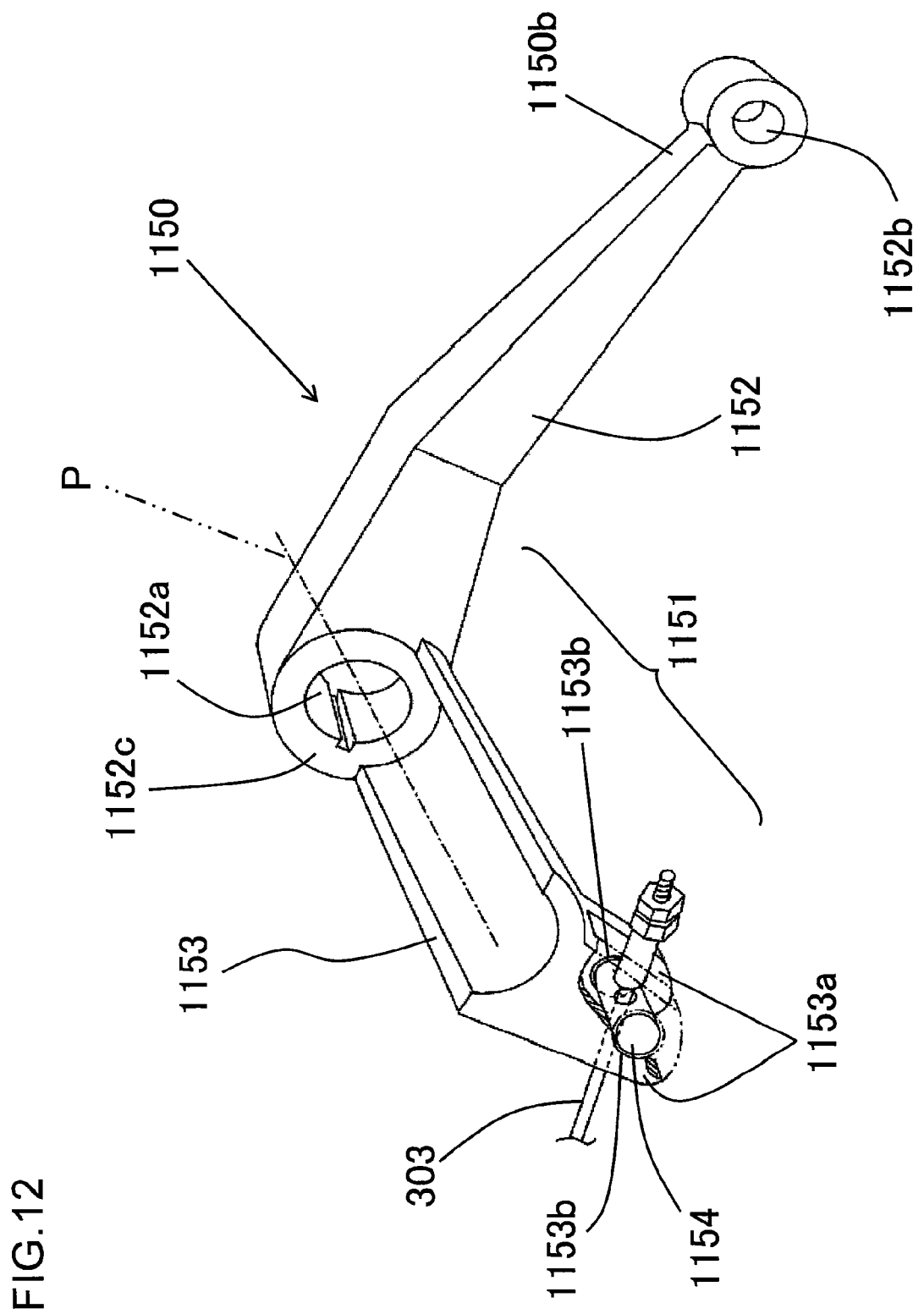
FIG. 12 is a perspective view illustrating a second lift arm according to Embodiment 2 of the present invention.

The constitution of the second tractor body 1105 in the present Embodiment 2 is the fundamentally same as the tractor body 105 in the above described Embodiment 1, except that a lift arm body 1152 and a part of a mower link mechanism 1110 are constituted in a single unit as shown in FIG. 12 which will be described later. In this Embodiment, the same reference signs are used for the constructional parts which are the same as the constructional parts described above, and then, the different part will be mainly described below.

As shown in FIG. 11, the second tractor body 1105 is detachably provided with a mower unit 200 via a mower link mechanism 1110 between the front wheels 101 and the rear wheels 102. A pair of right and left second lift arms 1150 are rotatably disposed about a pair of right and left lift arm rotary shafts 310 in the direction of arrow Q. A grass collecting unit or an another implement (not illustrated) can be detachably connected behind the chassis 104 via a connecting mechanism 140.

An output from engine 106, which is took off by a power take off mechanism (not illustrated) disposed below the engine 106 (see FIG. 2), is transmitted to the mower unit 200 through a power transmission belt (not illustrated), a rotary transmission shaft (not illustrated) and so on.

Further, the mower link mechanism 1110 has a pair of right and left pivotable links 111 which are supported to the chassis 104 in such a manner that they are vertically pivotable, a pair of right and left first mower links 300 described later, and the like. The distal ends of the pair of right and left pivotable links 111 are connected to rear connecting members 201 located at the rear portion of the mower unit 200.

The pair of right and left first mower links 300, which are disposed below the floor part 107 and are formed in shape such as a letter of L in alphabet, are rotatably supported to the chassis 104 via a first rotary shaft 301. One end part 300a of the pair of right and left first mower links 300 is connected to the lower distal end of the pivotable link 111 in such a manner that the one end part 300a is vertically pivotable, via a second mower link 302. And another end part 300b of the pair of right and left first mower links 300 is connected to a third mower link 1151 via a link rod 303. The third mower link 1151 and one end part of the second lift arm 1150 are constituted in a single unit. A distal end part 1150b of another end part of the second lift arm 1150 is connected to the grass collecting unit or another implement (not illustrated) and is used to perform the rising and lowering operation of the grass collecting unit and the like.

When the mower unit 200 is attached between the front wheels 101 and the rear wheels 102, another implement (not illustrated) is not attached to the pair of right and left second lift arms 1150, and the grass collecting unit is not necessarily attached to the second lift arms 1150.

When the mower unit 200 is not attached between the front wheels 101 and the rear wheels 102, another implement (not illustrated) is attached to the pair of right and left second lift arms 1150 to perform another working.

A lift control lever (not illustrated) is disposed at the right side of the operator's seat 103, the lift control lever is constituted so as to be movable to the rear direction and fore direction of the vehicle body from the neutral position.

While the lift control lever is moved backward by the operator, the second lift arm 1150 and the mower link mechanism 1110 continue rising by oil pressure. And the rise of the second lift arm 1150 and the mower link mechanism 1110 stops, when the operator separates the right hand from the lift control lever and the lift control lever returns to the neutral position.

While the lift control lever is moved forward by the operator, the second lift arm 1150 and the mower link mechanism 1110 continue lowering by oil pressure. And the lowering of the second lift arm 1150 and the mower link mechanism 1110 stops, when the operator separates the right hand from the lift control lever and the lift control lever returns to the neutral position. Accordingly, the implement attached to the second lift arm 1150 or the mower unit 200 attached to the mower link mechanism 1110 is raised or lowered. As described above, when the mower unit 200 is attached to the mower link mechanism 1110, the implement except the grass collecting unit is not attached to the second lift arm 1150, so that there is no problem about the above described operation.

Incidentally, the mower link mechanism 1110 of the present embodiment includes a pair of right and left pivotable links 111, the pair of right and left first mower links 300, the pair of right and left second mower links 302, the pair of right and left third mower links 1151, the pair of right and left link rods 303, and the like.

Figure 13:
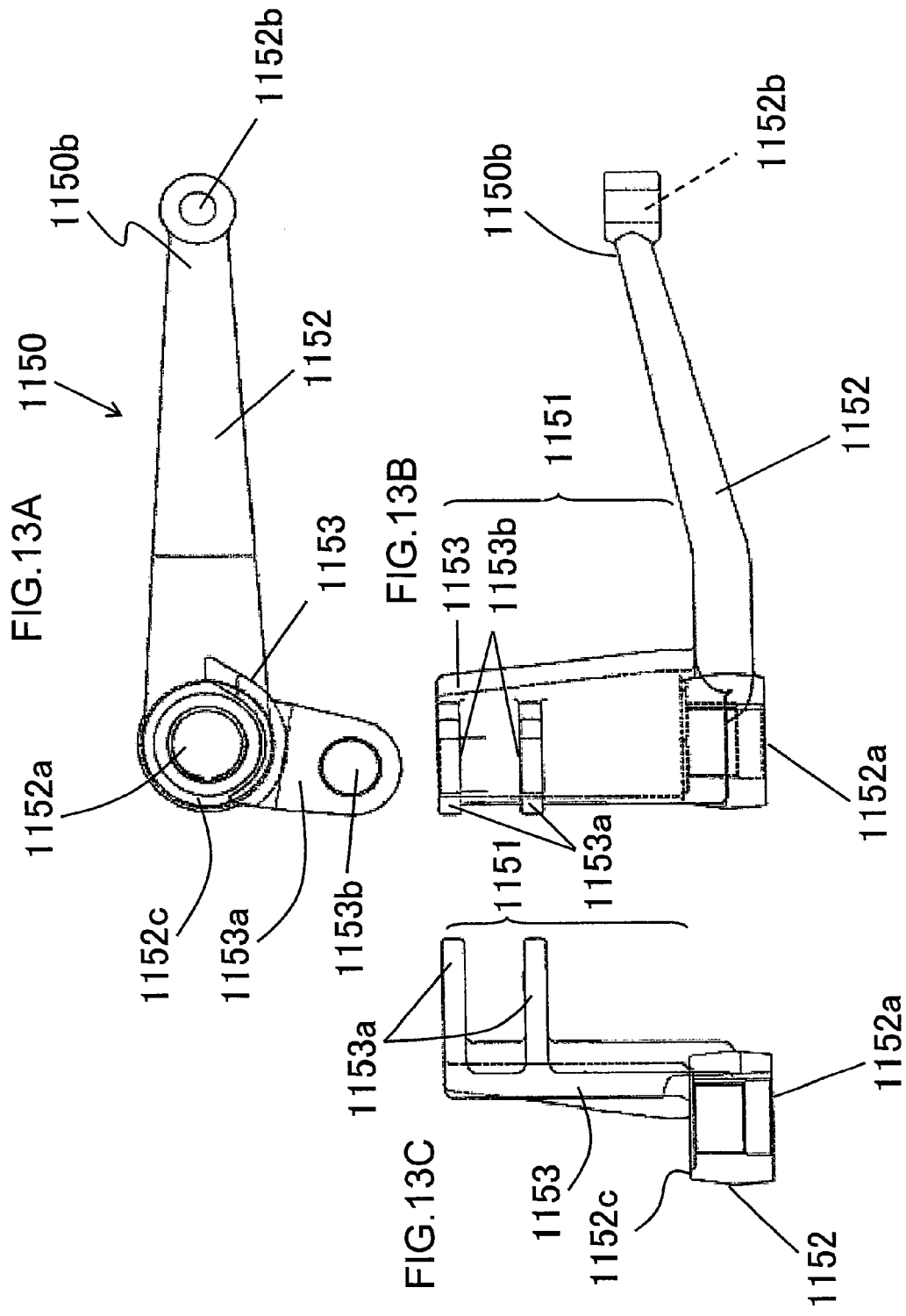
FIG. 13A is a plan view illustrating the second lift arm according to Embodiment 2 of the present invention.
FIG. 13B is a front view illustrating the second lift arm according to Embodiment 2 of the present invention.
FIG. 13C is a left side view illustrating the second lift arm according to Embodiment 2 of the present invention.

Further, the constitution of the second lift arm 1150 will be described hereinafter with reference FIGS. 12 and 13.

FIG. 12 is a perspective view illustrating the second lift arm 1150. FIG. 13A is a plan view illustrating the second lift arm 1150. FIG. 13B is a front view illustrating the second lift arm 1150. And FIG. 13C is a left side view illustrating the second lift arm 1150.

As shown in FIG. 12, the second lift arm 1150 is comprised of a lift arm body 1152 and a third mower link 1151. The lift arm body 1152 is provided with a shaft fixing hole 1152a for inserting and fixing the lift arm rotary shaft 310 to the one end part of the lift arm body 1152. Further, the lift arm body 1152 is provided with a connecting hole 1152b for connecting the grass collecting unit (not illustrated) and the like to the other end part thereof. The third mower link 1151 is provided with a protruding part 1153 projecting in the direction of axis P of the lift arm rotary shaft 310 from one edge part 1152c of the shaft fixing hole 1152a.

As shown in FIG. 12, a distal end part of the protruding part 1153 included in the third mower link 1151 is provided with a pair of right and left rod fixing protruding parts 1153a which protrude in the direction perpendicular to the direction of the axis P and separate an interval and counter mutually. The pair of right and left rod fixing protruding parts 1153a are provided with stopper inserting holes 1153b which are disposed in parallel with the direction of the axis P. A cylindrical stopper 1154, which is used for connecting the one end part of the link rod 303 to the rod fixing protruding parts 1153a, is rotatably inserted in the stopper inserting holes 1153b.

According the above described constitution, as shown in FIG. 11 since the pair of right and left pivotable links 111 work in response to the rising and lowering movement of the second lift arm 1150 in the direction of arrow Q so as to be pivoted via link rod 303 etc, the mower link mechanism 1110 is vertically pivoted relative to the chassis 104.

That is, as shown in FIG. 11, when the second lift arms 1150 rotate counterclockwise about the lift arm rotary shafts 310, the grass collecting unit (not illustrated) is lifted up, the link rods 303 are moved in the right direction in FIG. 11, the first mower links 300 rotate clockwise about the first rotary shafts 301, and the second mower links 302 are moved upward, the distal ends of the pivotable links 111 are moved upward, and as a result, the mower unit 200 is lifted up from the ground. Further, when the second lift arms 1150 rotate clockwise about the lift arm rotary shafts 310, the grass collecting unit (not illustrated) is lowered, the link rods 303 are moved in the left direction in FIG. 11, the first mower links 300 rotate counterclockwise about the first rotary shafts 301, and the second mower links 302 are moved downward, the distal ends of the pivotable links 111 are moved downward, and as a result, the mower unit 200 is lowered to the ground.

Accordingly, it becomes possible to perform selectively a lowered operative mode in which the ground gauge rollers 202 supporting the front portion and the rear portion of the mower unit 200 contact the ground, and a raised inoperative mode in which the ground gauge rollers 202 are raised from the ground, and the selective performance works in response to the rising and lowering movement of the second lift arm 1150.

According to the above constitution, since the third mower link 1151 which is a part of the mower link mechanism 1110 and the lift arm body 1152 are constituted in a single unit so as to form the second lift arm 1150, the number of parts is reduced, and it is not necessary to assemble both parts.

In the case of the conventional technology, since the part corresponding to the lift arm body 1152 and the part corresponding to the protruding part 1153 are separate parts and were connected with the spline fitting or the bolt etc, many parts were required. Therefore, as shown in FIG. 12, the lift arm body 1152 and the protruding part 1153 of the present embodiment are constituted in a single unit like a casting or welding of parts, the number of parts can be reduced, and it becomes the low-priced constitution.

By the way, as described above, the bottom cover 184 is a part of the floor part 107. Therefore, when the bottom cover 184 is removed, it is necessary to remove the whole of the floor part 107 fixed to the chassis 104 with screws. However, the present invention is not limited to this constitution. For instance, as shown in FIGS. 14A and 14B, a divisible floor 1107 can be divided into a front part and a rear part, the front part can be divided into a right side part and a left side part, and the right side part and the left side part of the front part can be further divided into two parts, respectively.

Figure 14:
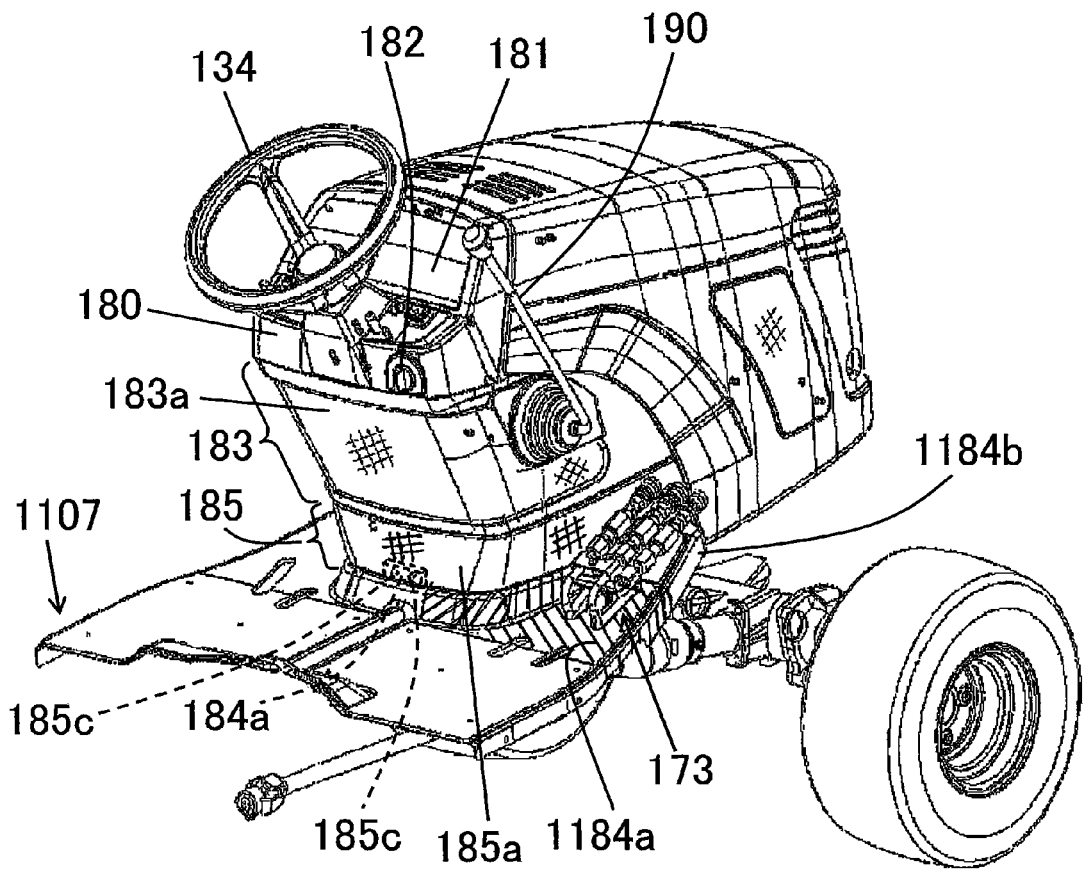
FIG. 14A is a perspective view illustrating a front part of the tractor body according to another Embodiment of the present invention.
FIG. 14B is a perspective view illustrating a first right side cover of the front part of the tractor body according to another Embodiment of the present invention.
Figure 14:
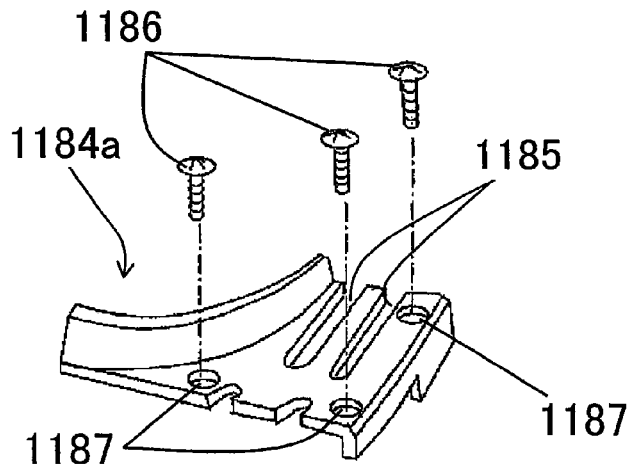

That is, as shown in FIG. 14A, a first right side cover 1184a, on which oblique lines have been drawn, and a second right side cover 1184b are fixed to the chassis 104 by screws, respectively so as to form the front right side part of the divisible floor 1107. An example of a bottom cover according to the present invention corresponds to the first right side cover 1184a as shown in FIGS. 14A and 14B.

As shown in FIG. 14B, the first right side cover 1184a is provided with notch parts 1185 to pass the piping of the coupler unit 173 and screw holes 1187 for the screws 1186 which are used for fixing the first right side cover 1184a to the chassis 104. Therefore, the first right side cover 1184a can be removed easily. Since the second right side cover 1184b is fixed to the chassis 104 by screws like the first right side cover 1184a, it can be removed easily.

As an example, when the maintenance of the piping disposed between the valve 171 and the coupler unit 173 is performed, it is necessary to remove at least the whole of the floor part 107, in the case of the constitution described in Embodiment 1 and Embodiment 2. However, in the case of the constitution as shown in FIGS. 14A and 14B, since the first right side cover 1184a and the second right side cover 1184b can be removed independently, the efficiency of the maintenance more improves.

In the case of the embodiment shown in FIG. 14A, it has been described that the divisible floor 1107 can be divided into a front part and a rear part, the front part can be divided into a right side part and a left side part, and the right side part and the left side part of the front part can be further divided into two parts, respectively. However, the present invention is not limited to this constitution. For instance, the divisible floor 1107 may be divided into only a front part and a rear part, or the front part may be divided into only a right side part and a left side part. Further, only the right side part of the front part may be divided into two parts, on the contrary the left side part of the front part does not be divided.

In the case of the above described embodiments, it has been described that the valve 171 are covered by the top cover 183, the bottom cover 184 and the middle cover 185 (see FIG. 2). However, the present invention is not limited to this constitution. For instance, the valve 171 can be covered by the bottom cover 184 and the middle cover 185, but is not covered by the top cover 183 (see FIG. 16).

Figure 16:
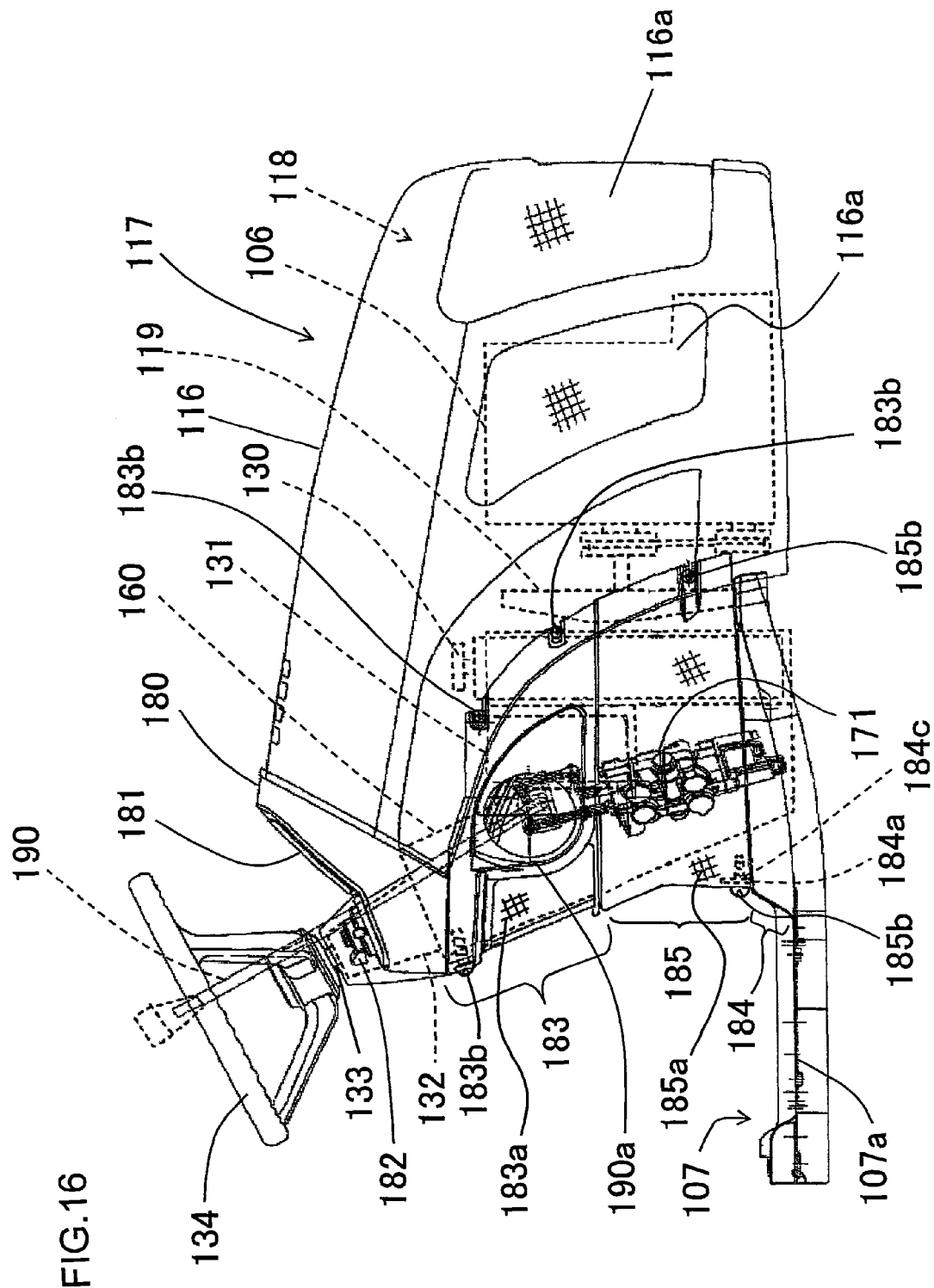
FIG. 16 is a schematic right side view illustrating the front part of the tractor body provided with a valve which is not covered by a top cover and is covered by a bottom cover and a middle cover, according to another Embodiment of the present invention.

In this case, it is possible to carry out the check, repair, and exchange of the valve 171 even if the top cover 183 is not removed. FIG. 16 is a schematic right side view illustrating the front part of the tractor body with a valve 171 which is not covered by a top cover 183 but is covered by a bottom cover 184 and a middle cover 185, according to another Embodiment of the present invention.

In the case of the above described embodiments, it has been described that the cover unit disposed below the control panel is constituted from the top cover 183, the bottom cover 184, and the middle cover 185. However, the present invention is not limited to this constitution. For instance, as shown in FIGS. 17 and 18, the cover unit disposed in space between the control panel 180 and a second floor part 2107 can be constituted from an upper side cover 2183 and a lower side cover 2186.

Figure 17:
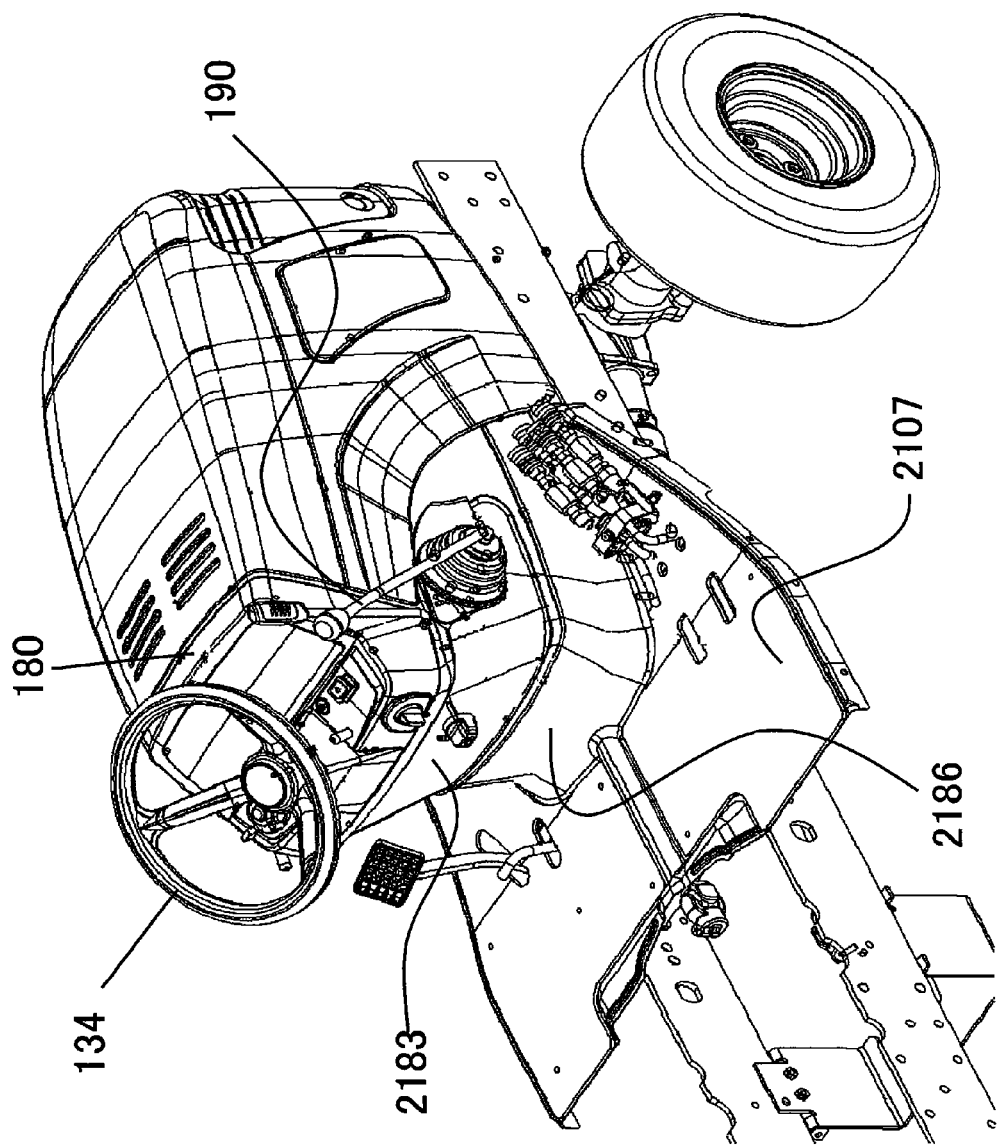
FIG. 17 is a perspective view illustrating the front part of the tractor body for explaining an upper cover and a lower cover, according to another Embodiment of the present invention.
Figure 18:
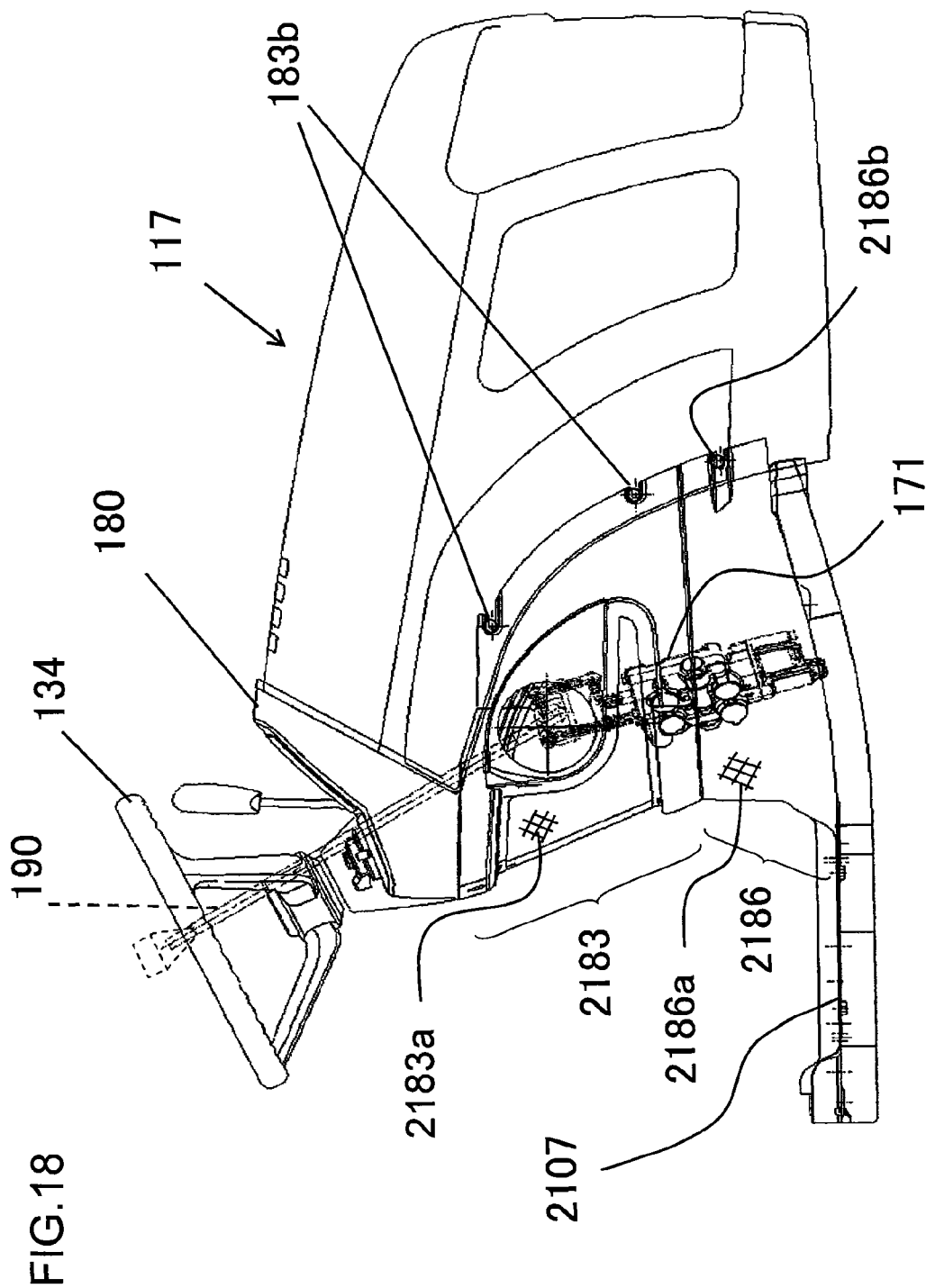
FIG. 18 is a schematic right side view illustrating the tractor body shown in FIG. 17.

FIG. 17 is a perspective view illustrating the front part of the tractor body for explaining the upper side cover 2183 and the lower side cover 2186, according to another Embodiment of the present invention. FIG. 18 is a schematic right side view illustrating the tractor body shown in FIG. 17. In this case, the upper side cover 2183 has the same constitution as the top cover 183 described in the above embodiment has. On the other hand, as shown in FIGS. 17 and 18, the lower side cover 2186 is formed so as to stand up from a front portion of the second floor part 2107, to be constituted in a single unit with the second floor part 2107, and the lower side cover 2186 is disposed in a lower part of the space neighboring to the upper side cover 2183. Incidentally, an upper ventilation opening 2183a and a lower ventilation opening 2186a having a structure for blocking dust are formed in the upper side cover 2183 and the lower side cover 2186, respectively (see FIG. 18).

In this case, how to remove the upper side cover 2183 is the same as the top cover 183. And since the upper side cover 2183 can be removed, the working efficiency improves like the case of the top cover 183 described above. Further, since the lower side cover 2186 and the second floor part 2107 are constituted in a single unit, the number of parts can be reduced, and the simple constitution can be performed.

When the upper side cover 2183 and the lower side cover 2186 are removed, for instance, the maintenance and exchange of the valve 171 or the valve unit 170 can be also performed. In this case, since the lower side cover 2186 and the second floor part 2107 are constituted in a single unit, it is necessary to unfasten and remove not only a pair of right and left screws 2186b of the lower side cover 2186 (see FIG. 18) but also the screws (not illustrated) for fixing the second floor part 2107 to the chassis 104 (see FIG. 5).

In the case of FIG. 18, it has been described that the valve 171 is covered by the upper side cover 2183 and the lower side cover 2186. However, the present invention is not limited to this constitution. For instance, the valve 171 can be covered by the lower side cover 2186 and not be covered by upper side cover 2183 (not illustrated).

In the case of the above described embodiments, it has been described that all of the top cover 183, the bottom cover 184, and the middle cover 185 are detachably connected to the vehicle body. However, the present invention is not limited to this constitution. For instance, at least the middle cover 185 may be detachable. In this case, the simple check with respect to the structure parts such as the valve 171 can be performed by detaching of the cover of smaller size (for example, the middle cover 185) than the cover of the conventional working vehicle.

In the case of the above described embodiments, it has been described that all of the upper side cover 2183 and the lower side cover 2186 are detachably connected to the vehicle body. However, the present invention is not limited to this constitution. For instance, at least the upper side cover 2183 may be detachable. In this case, the simple check with respect to the structure parts such as the valve 171 can be performed by detaching of the cover of smaller size (for example, the upper side cover 2183) than the cover of the conventional working vehicle.

INDUSTRIAL APPLICABILITY

The working vehicle according to the present invention provides an effect that it is possible to provide a working vehicle having a constitution in which the simple check with respect to the structure parts such as a valve can be performed since the cover of smaller size can be removed, and is effectively applied to a working vehicle to which the front loader, the mower unit or the like is attached.

REFERENCE SIGNS LIST

100 Tractor
101 Front wheel
102 Rear wheel
103 Operator's seat
104 Chassis
105 Tractor body
106 Engine
116 Engine hood
117 Driving force generating portion
118 Engine compartment
119 Radiator fan
120 Front loader
124 Bucket
160 Steering column frame (Post frame)
170 Valve unit
180 Control panel
183 Top cover
184 Bottom cover
185 Middle cover
190 Joy-stick control lever
200 Mower unit
2183 Upper side cover
2186 Lower side cover

What is claimed is:

1. A working vehicle attachable to an implement, comprising:
a steering wheel which is disposed in a rear side of an engine hood covering an engine compartment for accommodating an engine;
a control panel which is disposed near the steering wheel;
an operation lever which is disposed in a rear side of the engine hood and in a lateral side of the steering wheel;
a valve unit which includes a plurality of valves and which is disposed in the rear side of the engine hood and is connected to the operation lever;
an upper side cover which is disposed in an upper part of space between the control panel and a floor part; and
a lower side cover which is formed so as to stand up from a front portion of the floor part, to be constituted in a single unit with the floor part, and which is disposed in a lower part of the space, neighboring to the upper side cover,
wherein the valve is covered by the lower side cover, and the upper side cover is detachable,
wherein said valve unit is movable from a first position where it is connected to the operation lever to a second position outside of an opening formed by detaching said upper side cover without detaching said lower side cover and said control panel.

2. The working vehicle according to claim 1, further comprising:
a link mechanism which connects the operation lever to the valve,
wherein the link mechanism is covered by the upper side cover.

3. The working vehicle according to claim 1, further comprising:
a steering column frame which supports the steering wheel; and
a battery,
wherein the battery is disposed in a upper portion of a front side of the steering column frame.

4. The working vehicle according to claim 3, further comprising:
a radiator,
wherein the radiator is disposed in a front side of the battery, and is supported by the steering column frame.

5. The working vehicle according to claim 4,
wherein the upper side cover has a ventilation opening for sucking outside air which cools the radiator.

6. A working vehicle attachable to an implement, comprising:
a steering wheel which is disposed in a rear side of an engine hood covering an engine compartment for accommodating an engine;
a control panel which is disposed near the steering wheel;
an operation lever which is disposed in a rear side of the engine hood and in a lateral side of the steering wheel;
a valve unit which includes a plurality of valves and which is disposed in the rear side of the engine hood and is connected to the operation lever;
a top cover which is disposed below the control panel;
a bottom cover which includes a portion standing up from a floor surface and is a front portion of a floor part, and
a middle cover which is disposed between the top cover and the bottom cover,
wherein the valve is covered by the bottom cover and the middle cover, and
the top cover is detachable, wherein said valve unit is movable from a first position where it is connected to the operation lever to a second position outside of an opening formed by detaching said top cover without detaching said bottom cover and said middle cover.

7. The working vehicle according to claim 6, further comprising:
a link mechanism which connects the operation lever to the valve,
wherein the link mechanism is covered by the top cover.

8. The working vehicle according to claim 6, further comprising:
a steering column frame which supports the steering wheel; and
a battery,
wherein the battery is disposed in a upper portion of a front side of the steering column frame.

9. The working vehicle according to claim 8, further comprising:
a radiator,
wherein the radiator is disposed in a front side of the battery, and is supported by the steering column frame.

10. The working vehicle according to claim 9,
wherein each cover of the top cover and the middle cover has a ventilation opening for sucking outside air which cools the radiator.

* * * * *